(12) United States Patent
McGraw et al.

(10) Patent No.: US 8,874,482 B2
(45) Date of Patent: Oct. 28, 2014

(54) DEPOSIT PERMISSIONS FOR SPECIFIC NON-ACCOUNT HOLDERS

(75) Inventors: William H. McGraw, Charlotte, NC (US); Timothy B. Vannatter, Charlotten, NC (US); Joshua Bradley Schwartz, Medford, OR (US); Helene U. Mele, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 580 days.

(21) Appl. No.: 12/786,389

(22) Filed: May 24, 2010

(65) Prior Publication Data
US 2011/0288999 A1    Nov. 24, 2011

(51) Int. Cl.
*G06Q 20/40*    (2012.01)
*G06Q 40/00*    (2012.01)

(52) U.S. Cl.
CPC .............. *G06Q 40/00* (2013.01); *G06Q 20/40* (2013.01)
USPC .............................................. 705/44; 705/35

(58) Field of Classification Search
CPC combination set(s) only.
See application file for complete search history.

(56) References Cited

U.S. PATENT DOCUMENTS 7,752,107 B1 *   7/2010  Bent et al. ........................ 705/35
7,992,777 B1 *   8/2011  Block et al. .................... 235/379
2002/0082993 A1 * 6/2002  Hoyos et al. ..................... 705/43
2003/0097331 A1 * 5/2003  Cohen .............................. 705/39
2004/0039692 A1 * 2/2004  Shields et al. ................... 705/39
2004/0133516 A1 * 7/2004  Buchanan et al. ............... 705/42
2006/0200410 A1 * 9/2006  Kelley et al. ..................... 705/43
2007/0011091 A1 * 1/2007  Smith .............................. 705/39
2007/0016535 A1 * 1/2007  Tedesco et al. .................. 705/67
2009/0076934 A1 * 3/2009  Shahbazi et al. ................ 705/30
2009/0162184 A1 * 6/2009  Duncan et al. ................ 414/800
2010/0280948 A1 * 11/2010 Cohen ............................. 705/42

* cited by examiner

*Primary Examiner* — Hai Tran
(74) *Attorney, Agent, or Firm* — Banner & Witcoff, Ltd.; Michael A. Springs

(57) ABSTRACT

Systems and methods for permitting a specific individual to deposit monetary funds in an account are described. A first request to permit a specific individual to deposit monetary funds into an account associated with an entity may be received. The specific individual is not an account owner of the account. At least one account owner defined criterion identifying the specific individual is received, and data representing a permission for the specific individual to deposit monetary funds into the account associated with the entity is stored. The at least one criterion may include a name, an address, and/or some other identifier of the specific individual. One or more restrictions may be placed on the ability to deposit monetary funds in the account. Additional specific individuals with similar and/or different restrictions on the ability to deposit may be permitted to deposit monetary funds into the account.

33 Claims, 22 Drawing Sheets

You are not an account holder with this entity, but you can deposit monetary funds into Account ID X.

How would you like to deposit monetary funds into Account ID X?

Please choose one of:

○ Credit Card  ○ Check

○ Cash  ○ Other

○ Debit Card

FIG. 8

You are an account holder with this entity, what do you want to do?

Please choose one of:

○ Access my account

○ Deposit monetary funds into Account ID X

FIG. 9A

You are an account holder with this entity and you want to create an access code for deposit of monetary funds into your account.

Any restrictions?

◯ Only till a specific time: [March 31, 2012]

◯ Only an amount in range: [$XXX.XX] Max
[$X.XX] Min

◯ Unless a specified individual, only paper tickets authorized for deposit

[GENERATE]

Generation of an access code for deposit of monetary funds into your account is complete.

What do you want to do?

◯ Print access code

◯ Obtain link to access code to distribute

◯ Send email with access code included

You are an account holder with this entity and you want to allow a non-account holder to deposit monetary funds into your account.

1101 → Please specify the individual:

Full Name: [Individual X]

Address: [Street, City, State, Zip Code]

ID Number: [xxx-xx-xxxx]

DOB: [Month/Date/Year]

Transaction ID: [Transaction #XXXXX]

Other: [ ]

1103 → [Another individual?]

FIG. 11A

You are an account holder with this entity and you want to allow a non-account holder to deposit monetary funds into your account.

Any restrictions? ← 1105

○ Only till a specific time: [March 31, 2012]

○ Only an amount in range: [$XXX.XX] Max
[$X.XX] Min

○ By RFID Only

○ Cash Deposit Only

○ Other

[PERMIT] ← 1107

You have a credit card with this entity.

You would like to:

○ Permit payment deposits at ATM of entity for this credit card

Any restrictions?

○ Only till a specific time: [March 31, 2012]

○ Only an amount in range: [$XXX.XX] Max
   [$XX.XX] Min

○ By RFID Only

○ Cash Deposit Only

○ Other

[PERMIT] ← 1303

You can deposit monetary funds to pay the balance of your credit card with this entity.

How would you like to deposit monetary funds?

Please choose one of:

○ Other Credit Card    ○ Check

○ Cash    ○ Other

○ Debit Card

DEPOSIT PERMISSIONS FOR SPECIFIC NON-ACCOUNT HOLDERS

BACKGROUND

Any of a number of manners exists today for an account owner to deposit monetary funds into her account. The account owner can enter a financial institution entity and interact face-to-face with a teller of the financial institution entity. The account owner may deposit cash, checks, or other forms of monetary funds into her corresponding account by giving the monetary funds to the teller. Other manners include depositing cash and/or checks at an automated teller machine associated with the financial institution entity, transferring monetary funds from one account to another account in an online environment, and/or other manners. However, the account owner must present some form of identification in order to make a deposit.

In order to allow a non-account owner to make a deposit into the account of the owner, the owner is required to present the account number to the non-account owner. For example, an owner can provide a pre-printed deposit slip to the non-account holder to make a deposit; however, the pre-printed deposit slip includes the account number of the owner, in additional to other sensitive information of the owner. Such a non-account owner is required to provide some form of identification to deposit monetary funds, even with a pre-printed deposit slip. A need exists for a mechanism to allow a non-account holder to deposit monetary funds into the account of the owner.

Many financial institutions that offer checking and savings accounts also offer credit card accounts to potential customers. Individuals with a checking and/or savings account may receive an access card, such as an automated teller machine (ATM) card, for use at an ATM. Yet, individuals with a credit card account, but no checking and/or savings account, do not receive such as access card. As such, if the individual with the credit card account desires to make a credit card payment, she is required to submit a payment by mail and/or telephone. A need exists for a mechanism to allow a credit card account holder to deposit monetary funds for a credit card account at an automated teller machine.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a method and system for generating an access code. A first request to generate an access code for permitting a first individual to deposit monetary funds into an account associated with an entity is received. The first individual is not an account owner of the account. The access code for permitting the first individual to deposit monetary funds into the account associated with the entity is generated. A second request to output the access code for permitting the first individual to deposit monetary funds into the account associated with the entity is received, and the access code for permitting the first individual to deposit monetary funds into the account associated with the entity is outputted. One or more restrictions may be placed on the ability to deposit monetary funds in the account. The access code may be a barcode on a printed paper, may be included in an email, and/or may be associated with an Internet addressable address.

Other aspects of the present disclosure are directed to a method and system for depositing monetary funds into an account. A first request from a first individual to deposit monetary funds into an account associated with an entity may be received. The first individual is not an account owner of the account. Monetary funds from the first individual may be received for deposit in the account. The monetary funds may include cash, checks, credit card transfers, and/or debit card transfers. The receipt of the first request may be receipt of a paper ticket with an access code authorizing deposit of monetary funds into the account. One or more restrictions may be reviewed to authorize the deposit of monetary funds in the account.

Still further aspects of the present disclosure are directed to a method and system for permitting a specific individual to deposit monetary funds in an account. A first request to permit a specific individual to deposit monetary funds into an account associated with an entity may be received. The specific individual is not an account owner of the account. At least one account owner defined criterion identifying the specific individual is received, and data representing a permission for the specific individual to deposit monetary funds into the account associated with the entity is stored. The at least one criterion may include a name, an address, and/or some other identifier of the specific individual. One or more restrictions may be placed on the ability to deposit monetary funds in the account. Additional specific individuals with similar and/or different restrictions on the ability to deposit may be permitted to deposit monetary funds into the account.

Other aspects of the present disclosure are directed to a method and system for depositing monetary funds into an account. A specific individual may be identified by reading a form of identification of the specific individual, such as a credit card, a debit card, or an RFID associated with a mobile terminal of the specific individual. A determination may be made as to whether the specific individual is permitted to deposit monetary funds into an account associated with an entity. The specific individual is not an account owner of the account. A request from the specific individual to deposit monetary funds into the account associated with the entity may be received, and monetary funds from the specific individual for deposit in the account may be received. One or more restrictions may be reviewed to authorize the deposit of monetary funds in the account.

Additional aspects of the present disclosure are directed to a method and system for permitting a credit card payment. An individual associated with a credit card account of an entity may be identified. A request to permit the individual associated with the credit card account of the entity to deposit a credit card payment in a self-service financial transaction device associated with the entity may be received. An identifier of the individual associated with the credit card account may be read. A request from the individual to deposit monetary funds as the credit card payment into the self-service financial transaction device may be received, and a determination may be made as to whether the individual is authorized to make the deposit. Monetary funds from the individual for deposit as the credit card payment may be received. One or more restrictions may be placed on the ability to deposit monetary funds as the credit card payment.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIG. 8 is an illustrative user interface for depositing monetary funds into an account in accordance with at least one aspect of the present disclosure;

FIGS. 9A and 9B are illustrative user interfaces for depositing monetary funds into an account in accordance with at least one aspect of the present disclosure;

FIGS. 10A and 10B are illustrative user interfaces for generating an access code permitting depositing of monetary funds into an account in accordance with at least one aspect of the present disclosure;

FIGS. 11A and 11B are illustrative user interfaces for permitting one or more specific individuals to deposit monetary funds into an account in accordance with at least one aspect of the present disclosure;

FIG. 13 is an illustrative user interface for permitting deposit of a credit card payment in accordance with at least one aspect of the present disclosure;

FIG. 14 is an illustrative user interface for depositing a credit card payment in accordance with at least one aspect of the present disclosure;

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
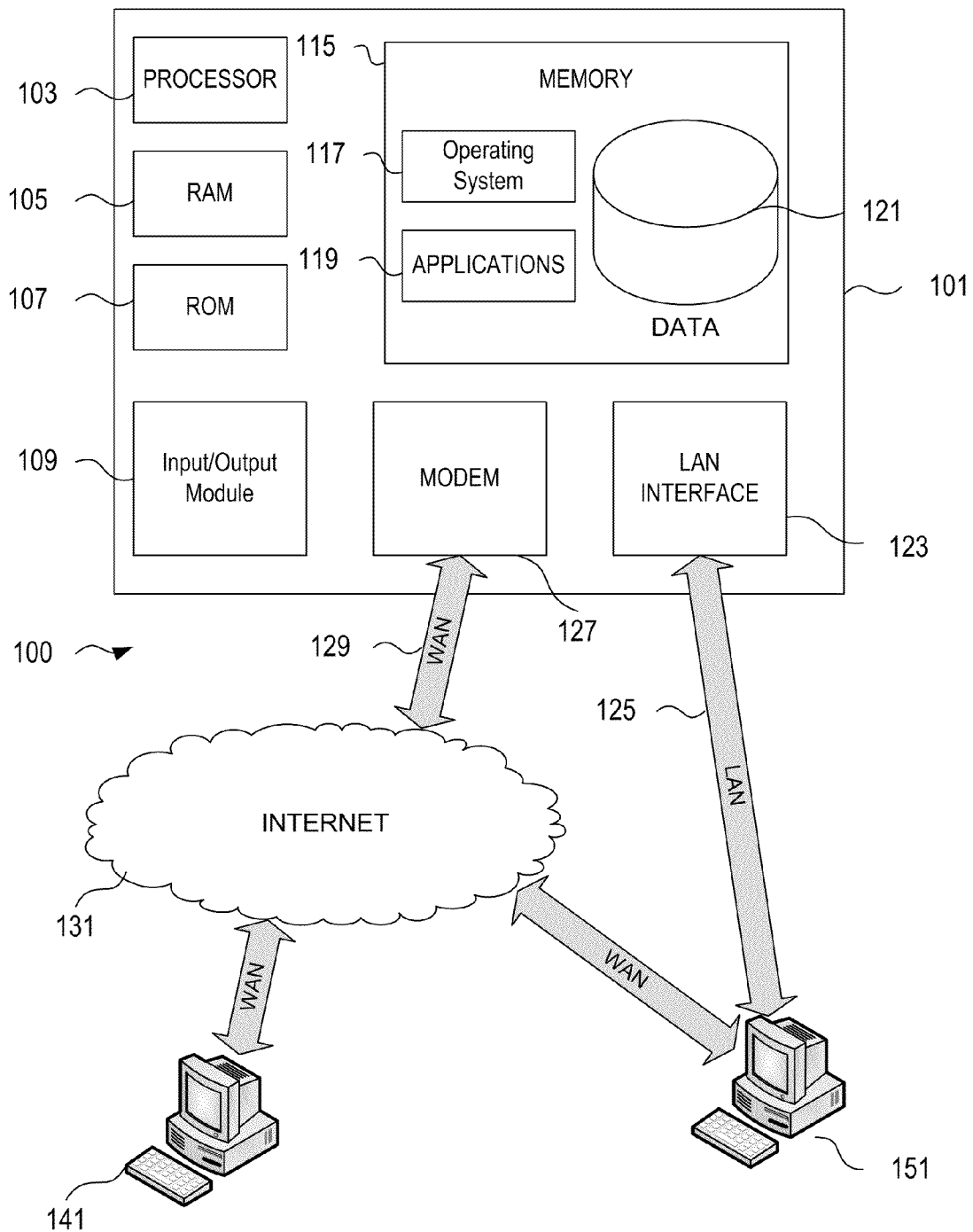
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
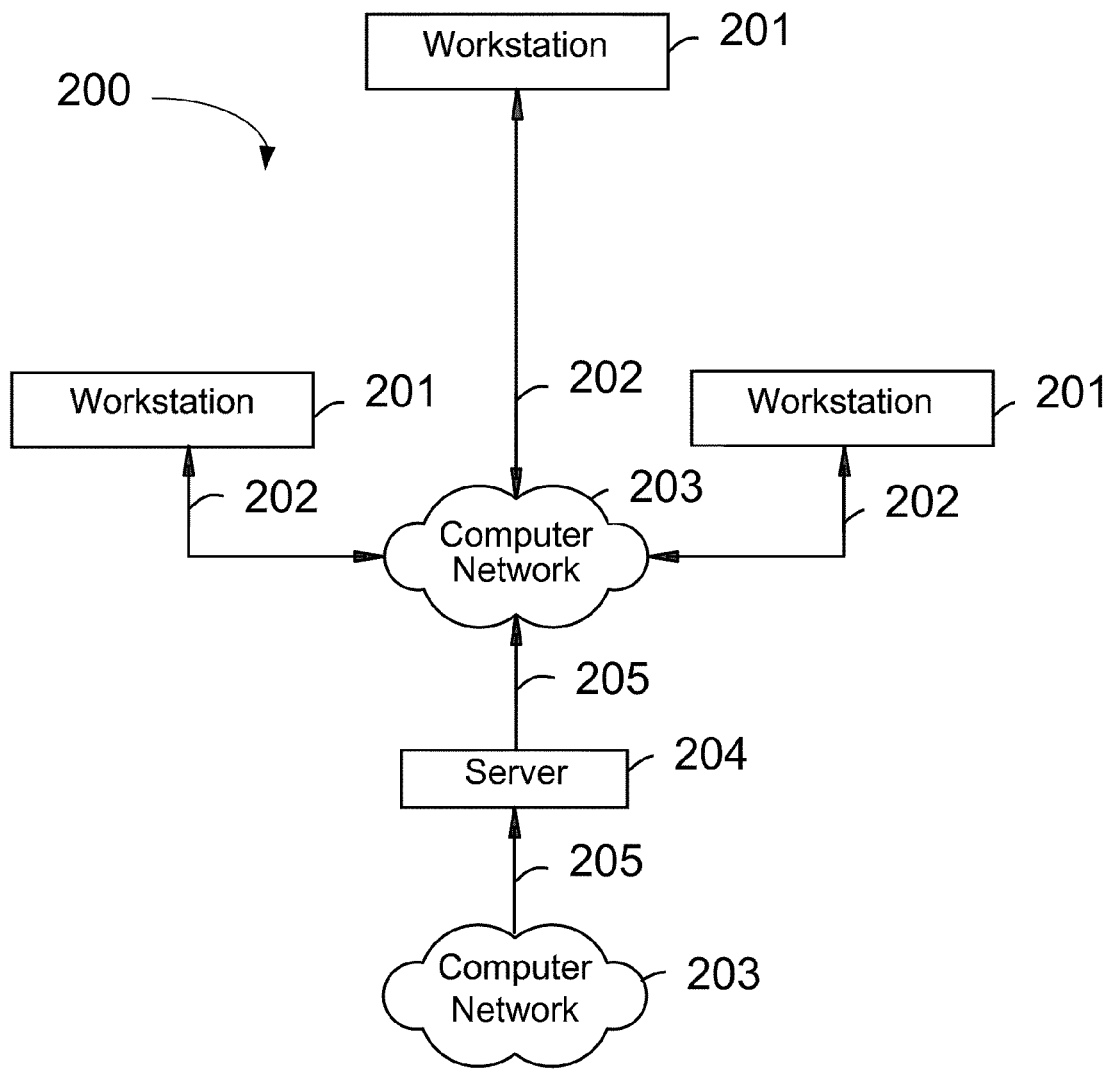
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
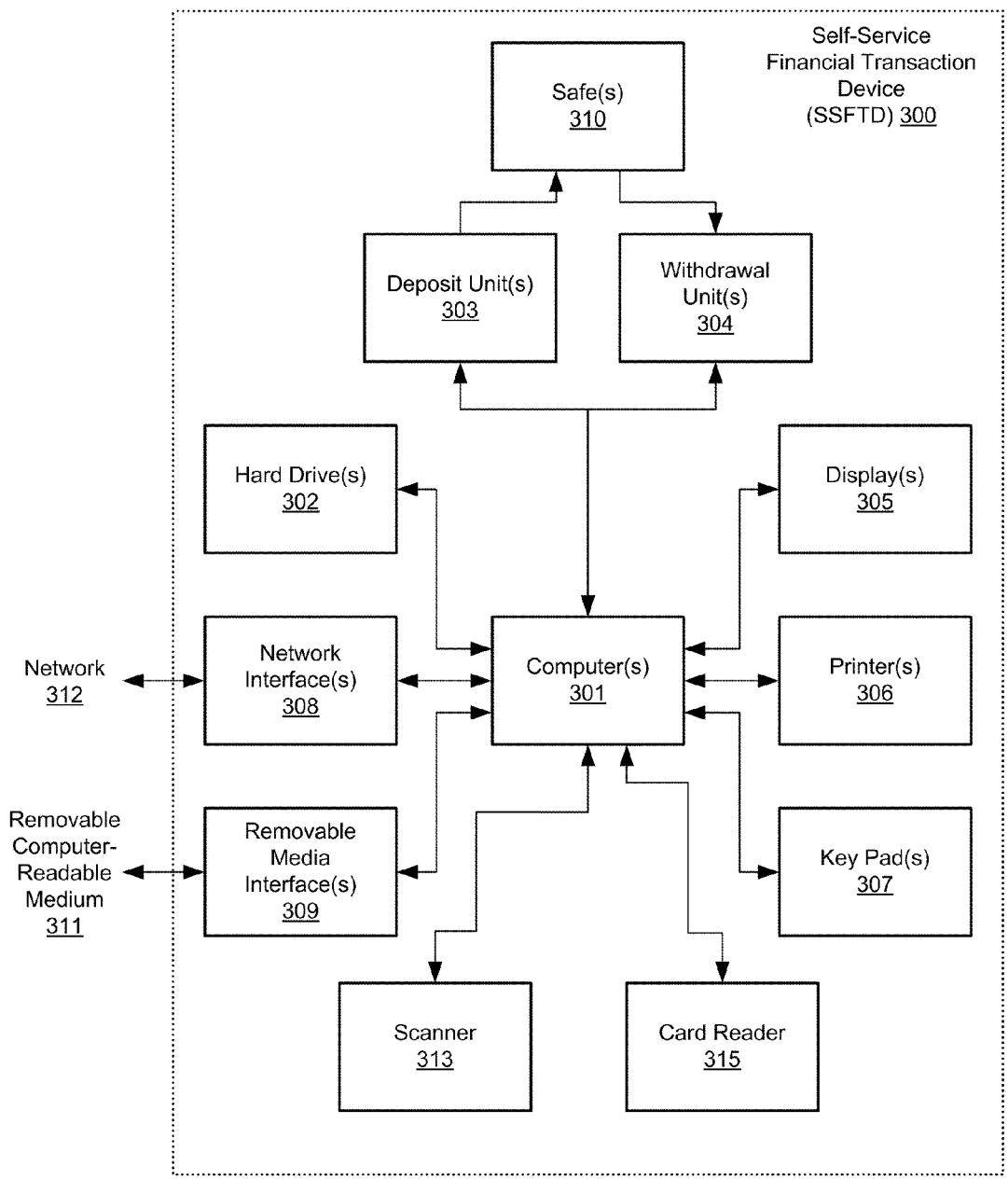
FIG. 3 is an illustrative functional block diagram of a self-service financial transaction device (SSFTD) in accordance with at least one aspect of the present disclosure.

FIG. 3 is an illustrative functional block diagram of a self-service monetary device (SSFTD) 300. SSFTD 300 may include, for instance, an automated teller machine (ATM) or automated kiosk for depositing and/or withdrawing monetary amounts. While the withdrawals are typically provided to the user of the SSFTD 300 as currency, the deposits may be in the form of currency, checks, or other forms.

SSFTD 300 as shown in FIG. 3 includes a computer 301, a hard drive 302 or other computer-readable medium, a deposit unit 303, a withdrawal unit 304, a display 305, a printer 306, a keypad 307, a network interface 308, a removable media interface 309, a safe 310, a scanner 313, and a card reader 315. Although computer 301 is labeled as a "computer," any one or more of the other functional blocks in FIG. 3 may also be or include a computer. As understood, SSFTD 300 may include one or more computers 301, hard drives 302, deposit units 303, withdrawal units 304, displays 305, printers 306, keypads 307, network interfaces 308, removable media interfaces 309, safes 310, scanners 313, and card readers 315.

The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 3 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memory chips, hard drives (e.g., hard drive 302), optical discs (such as CDs or DVDs), magnetic discs, and magnetic tape drives. A computer-readable medium may be considered part of a larger device or it may be itself removable from the device. For example, a commonly-used removable computer-readable medium is a universal serial bus (USB) memory stick that interfaces with a USB port of a device.

A computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 3 and may store computer-executable instructions and/or data used by any of those functional blocks. Alternatively or additionally, such a computer-readable medium storing the data and/or software may be physically separate from, yet accessible by, any of the functional blocks shown in FIG. 3.

Where SSFTD 300 is an ATM, computer 301 is typically embodied as a personal computer. In this example, computer 301 may be responsible for the overall control of SSFTD 100. To perform such control, computer 301 may execute, for example, one or more software applications, one or more device control programs, and one or more operating systems, each of which may be stored on hard drive 302, which may be a single physical hard drive or multiple physical hard drives. These various elements will be discussed in further detail below.

Hard drive 302 may be a single physical hard drive unit or may include multiple physical hard drive units. Rather than, or in addition to, hard drive 302, SSFTD 300 may store data and/or computer-executable instructions on one or more other types of computer-readable medium, such as an optical disc drive, a magnetic tape drive, and/or memory chips.

Deposit unit 303 may be responsible for physically receiving deposited items such as currency and checks, for physically counting the deposited items, for physically holding the deposited items in an escrow area during a deposit transaction, for determining the value of the deposited items, and for physically transferring the deposited items to safe 310 when the transaction is complete.

Withdrawal unit 304 may be responsible for physically retrieving currency or other items from safe 310 during a withdrawal transaction, and for physically providing the retrieved currency to the user.

Display 305 may be responsible for displaying a visual user interface to the user, and may also incorporate a touch screen capability for receiving user input. Typical information that may be presented on display 305 includes text and/or graphics representing the status of a transaction. Likewise, printer 306 may be responsible for presenting a paper printout containing information about a transaction.

Key pad 307 may include one or more buttons, switches, and/or other physical user input elements, and may be responsible for receiving user input associated with a transaction. For example, key pad 307 may include digit keys zero through nine and other function keys. Card reader 315 may be any type of device that reads data from a card, such as the magnetic strip on magnetic cards such as ATM/bank cards.

Network interface 308 may be responsible for data communication between SSFTD 300 and a network 312. The communication may be uni-directional or bi-directional. Network 312 may be a single network or combination of multiple coupled networks, and may be wireless and/or wired. Examples of network 312, or portions thereof, include the Internet, a cellular telephone network, a cellular data network, a wired or wireless local area network, and a satellite communication network.

Removable media interface 309 may be responsible for reading from and/or writing to a removable computer-readable medium 311, such as a USB key, a compact disc (CD), a floppy magnetic disc, or a portable hard drive. Removable media interface 309 may therefore include a physical port for plugging in or otherwise temporarily receiving removable computer-readable medium 311. This port may be physically part of, for instance, the housing of computer 301. However, the port may be located elsewhere in or on SSFTD 300, such as on a rear housing of SSFTD 300 that may be accessible to maintenance servicers of SSFTD 300 but not necessarily to the general public. Regardless of the location of the port, data read from removable computer-readable medium 311 by removable media interface 309 may be provided to computer 301, and data provided by computer 301 may be written by removable media interface 109 to computer-readable medium 311.

Scanner 313 may include, for instance, a camera that is able to take a digital photograph of a check to produce one or more images representing the front and/or back of the check. In addition to generating an image of the check, scanner 313 may be further capable of reading magnetically printed information on the check, such as magnetic ink that is typically printed on a check, and performing magnetic ink character recognition (MICR). Such MICR processes are well known. The data produced by performing MICR that represents the recognized magnetic ink characters is referred to herein as MICR data. Scanner 313 further may be configured to capture an access code as described herein. The access code may be a barcode printed on a paper ticket. The paper ticket may be scanned to read the barcode included. The access code also may be a barcode displayed on a mobile device, such as a cellular telephone. A user may place the display of the mobile device in the scanning field of view of the scanner 313 and the barcode may be read there from without the need for a paper ticket. Scanner 313 also may be configured to read a radio frequency identification (RFID) associated with a card, a mobile device, and/or some other apparatus of an individual.

Figure 4:
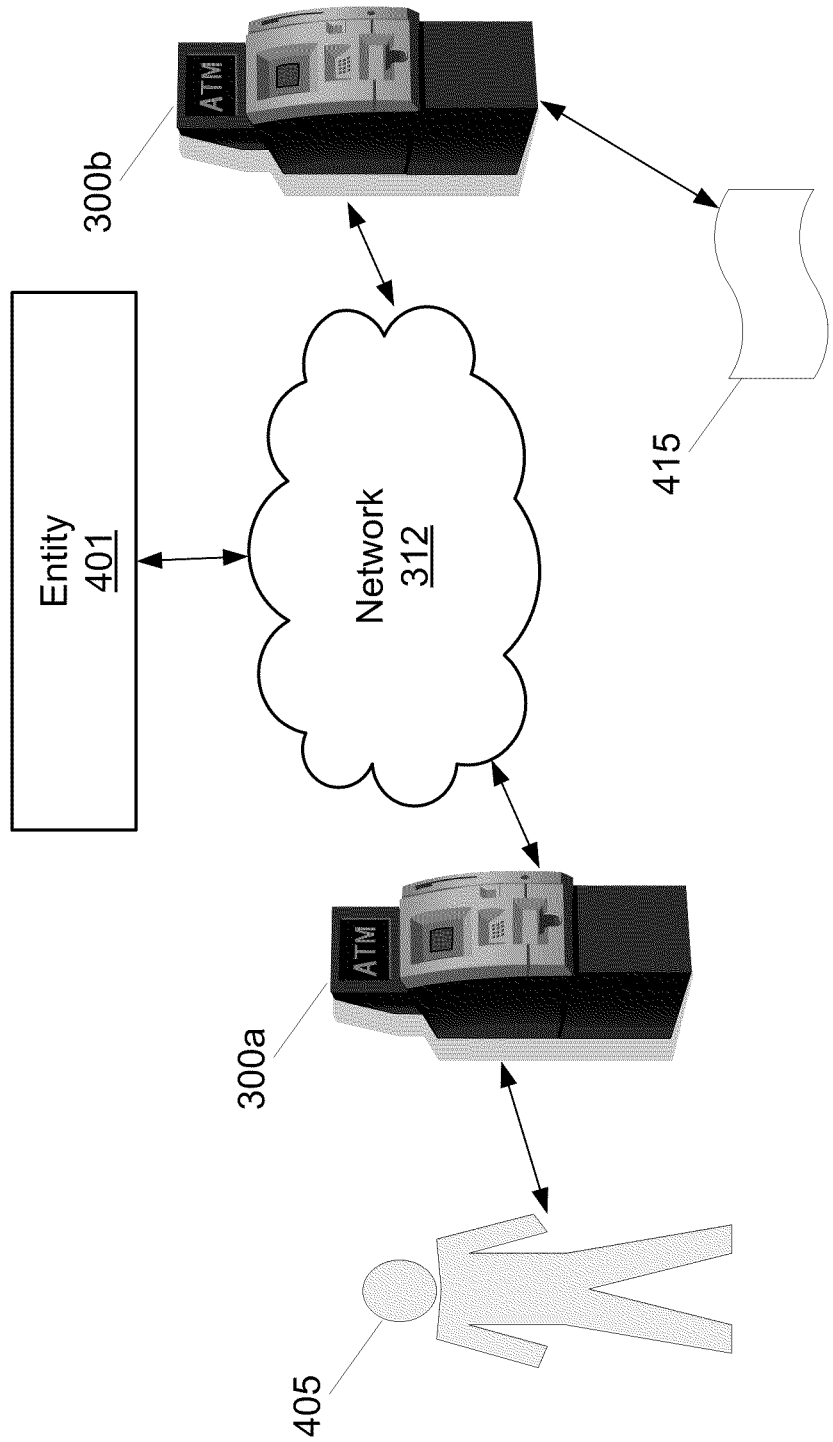
FIG. 4 is an illustrative block diagram of a system for deposit of monetary funds in accordance with at least one aspect of the present disclosure.

FIG. 4 is an illustrative block diagram of a system for deposit of monetary funds in accordance with at least one aspect of the present disclosure. FIG. 4 illustrates a system for generation and use of a paper ticket 415 with an access code allowing deposit of monetary funds into an account where the individual making the deposit is a non-account owner on the account. An account owner 405 may access a self-service financial transaction device 300a, such as an automated teller machine (ATM). Alternatively, although not shown in FIG. 4, the account owner 405 may access a computer operatively connected to an entity 401 through a network 312. The self-service financial transaction device 300a may be connected to an entity 401 though a network 312. Network 312 may include one or more networks, whether publicly accessible, privately accessible, or a combination of the two. In addition, network 312 may include wired, wireless, or a combination of both technologies for implementation. Network 312 may include intranets and/or the Internet.

Entity 401 may be a financial institution that owns and/or operates the self-service financial transaction device 300a for distribution of information and/or monetary funds to an individual and/or to receive information and/or monetary funds from an individual. Account owner 405 may access a corresponding account of the account owner 405 that she has with the entity 401 by utilizing the self-service financial transaction device 300a. After some form of authentication of the account owner 405, the account owner 405 may request to generate an access code for permitting an individual to deposit monetary funds into the account associated with an entity. This individual being permitted to deposit monetary funds is not an account owner of the account.

As part of the process for generating an access code to allow for automated deposit of monetary funds, the account owner 405 may include one or more account owner defined criteria associated with the access code. These one or more criteria may include identification of a specific individual, as described below in more detail below with respect to FIGS. 11A-11B and 17. In addition, these one or more criteria may include one or more restrictions on the permission to allow for deposit of monetary funds into the account. Such an illustrative criterion includes a restriction on the time period in which a deposit may be made. The account owner 405 may want to allow an individual to only deposit for a specific period of time, for an allowable period of time in a day, month, year, and/or until a specific date and time. Another illustrative criterion includes a restriction on requiring a minimum and/or maximum threshold amount of monetary funds that may be deposited. The account owner 405 may desire that minimum amounts of monetary funds are required for depositing and/or a maximum amount may be set as a threshold to restrict large amounts of deposit in the account. Any of a number of other restrictions and/or account owner 405 defined criteria may be associated with the access code.

The access code may be generated by the self-service financial transaction device 300a. In the example shown in FIG. 4, the account owner 405 may request the self-service financial transaction device 300a to output the access code by printing a paper ticket 415. Paper ticket 415 may include any of a number of types of identification of the permission to deposit monetary funds into the account of the account owner 405 without providing account number data of the account owner 405. Paper ticket 415 may include a barcode for reading by a self-service financial transaction device, such as self-service financial transaction device 300*b* as shown in FIG. 4. If paper ticket 415 includes a barcode, the barcode may be encrypted to ensure greater protection against the dissemination of sensitive and/or confidential information associated with the owner of the account 405.

With the paper ticket 415, account owner 405 may distribute the paper ticket 415 to an individual that is not an owner of the associated account. For example, the account may be for a child and the account owner 405 may be a parent having control over the account. In such an example, the account owner 405 may distribute the paper ticket 415 to a grandparent of the child. Then, the grandparent of the child may make a deposit of monetary funds into the account even though the grandparent is not an account owner on the account. The grandparent may utilize the paper ticket 415 at the same and/or a different self-service financial transaction device. As shown in FIG. 4, the grandparent may utilize paper ticket 415 at a different self-service financial transaction device 300*b* although it is understood that the same self-service financial transaction device 300*a* may be used as well.

In the example of FIG. 4, entity 401 may own and/or operate the self-service financial transaction device 300*b*, like self-service financial transaction device 300*a*, for distribution of information and/or monetary funds to an individual and/or to receive information and/or monetary funds from an individual. As should be understood, self-service financial transaction devices 300*a* and 300*b* may be different self-service financial transaction devices that are owned and/or operated by different entities 401. In such an example, the two different entities 401 would perform common transfers of monetary funds in accordance with the description described herein in addition to conventional manners.

When accessing self-service financial transaction device 300*b* with paper ticket 415, an individual may be identified as an individual that has an account, although different from the account associated with the paper ticket 415, with the entity 401. For example, entity 401 may be a bank and the account owner 405 may have a checking account associated with the paper ticket 415 and the individual using the paper ticket 415 at self-service financial transaction device 300*b* may have a different savings account with the entity bank 401. Alternatively, the individual need not be identified at all by the self-service financial transaction device 300*b*.

If one or more account owner criteria and/or restrictions have been associated with the access code included on the paper ticket 415, a determination may be made by the self-service financial transaction device 300*b* and/or other external computer as to whether the individual is prevented from depositing monetary funds into the account associated with the paper ticket 415. If no criteria exist and/or if no restrictions prevent the deposit, the individual utilizing the paper ticket may deposit any of a number of different types of monetary funds into the self-service financial transaction device 300*b*. For example, monetary funds may include cash, checks, charges to a credit card or debit card of the individual, and/or other types of monetary funds. The present disclosure is not so limited to the examples provided herein. Upon receipt of the monetary funds and optional confirmation of the monetary funds as not falsified monetary funds, the amount of the monetary funds may be transferred into the account of the account owner 405 associated with the paper ticket 415.

Figure 5:
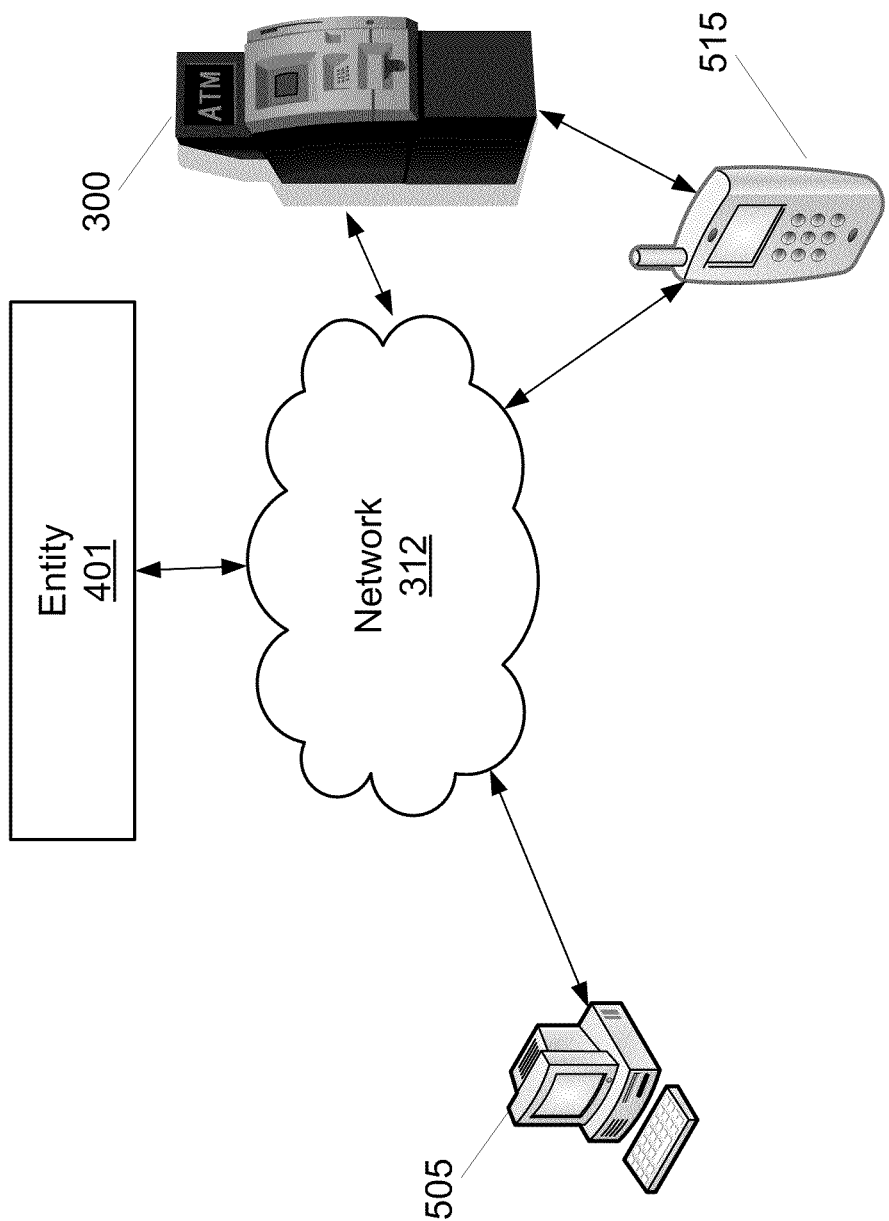
FIG. 5 is another illustrative block diagram of a system for deposit of monetary funds in accordance with at least one aspect of the present disclosure.

FIG. 5 is another illustrative block diagram of a system for deposit of monetary funds in accordance with at least one aspect of the present disclosure. FIG. 5 is similar to FIG. 4 except that it illustrates a system for generation and use of an electronic access code maintained in a mobile device 515 allowing deposit of monetary funds into an account where the individual making the deposit is a non-account owner on the account. An account owner, such as account owner 405 in FIG. 4, may access a self-service financial transaction device, such as self-service financial transaction device 300*a* in FIG. 4, or a computer 505 operatively connected to entity 401 through network 312. Computer 505 may be connected to entity 401 though network 312.

An account owner may access a corresponding account of the account owner that she has with the entity 401 by utilizing computer 505. After some form of authentication of the account owner, the account owner may request to generate an access code for permitting an individual to deposit monetary funds into the account associated with an entity. This individual being permitted to deposit monetary funds is not an account owner of the account. As part of the process for generating an access code to allow for automated deposit of monetary funds, the account owner may include one or more account owner defined criteria associated with the access code.

The access code may be generated by computer 505. In the example shown in FIG. 5, the account owner may request the computer 505 to output the access code by generating an email that includes the access code and/or an Internet accessible address to the access code. The access code may include any of a number of types of identification of the permission to deposit monetary funds into the account of the account owner without providing account number data of the account owner.

Account owner may distribute the access code to an individual that is not an owner of the associated account by dissemination of an email with the access code, a broadcast of the access code by means of a universal resource locator (URL) link, and/or some other manner. In the example of FIG. 5, the account owner may distribute an email with the access code included. An individual may access the email via a mobile device 515. Then, the individual may make a deposit of monetary funds into the account even though the individual is not an account owner on the account. The individual may utilize her mobile terminal 515 at the same and/or a different self-service financial transaction device. As shown in FIG. 5, the individual may utilize a self-service financial transaction device 300. In this example, the individual may receive the email with the barcode via a cellular network connection to network 312 and then display the barcode on a display of mobile terminal 515. Self-service financial transaction device 300 may be configured to scan the barcode from the display of the mobile terminal 515 in a similar manner as scanning a paper ticket 415 shown in FIG. 4.

If one or more account owner criteria and/or restrictions have been associated with the access code, a determination may be made by the self-service financial transaction device 300 and/or other external computer as to whether the individual is prevented from depositing monetary funds into the account associated with the access code. If no criteria exist and/or if no restrictions prevent the deposit, the individual utilizing the access code may deposit any of a number of different types of monetary funds into the self-service financial transaction device 300*b*. Upon receipt of the monetary funds and optional confirmation of the monetary funds as not falsified monetary funds, the amount of the monetary funds may be transferred into the account of the account owner associated with the access code.

Still further, although described as scanning a barcode displayed on a mobile terminal 515 in FIG. 5, mobile terminal 515 may not need a barcode for scanning to be displayed. Upon accessing the self-service financial transaction device 300, an RFID associated with the mobile terminal 515 of the individual may be identified. The RFID may be correlated to a database of information as to the allowance of the individual to deposit monetary funds into the account. In one example, upon receiving the RFID of the mobile terminal 515 of the individual, the self-service financial transaction device 515 may communicate with the mobile terminal 515 to receive additional data, such as an electronic access code.

Figure 6:
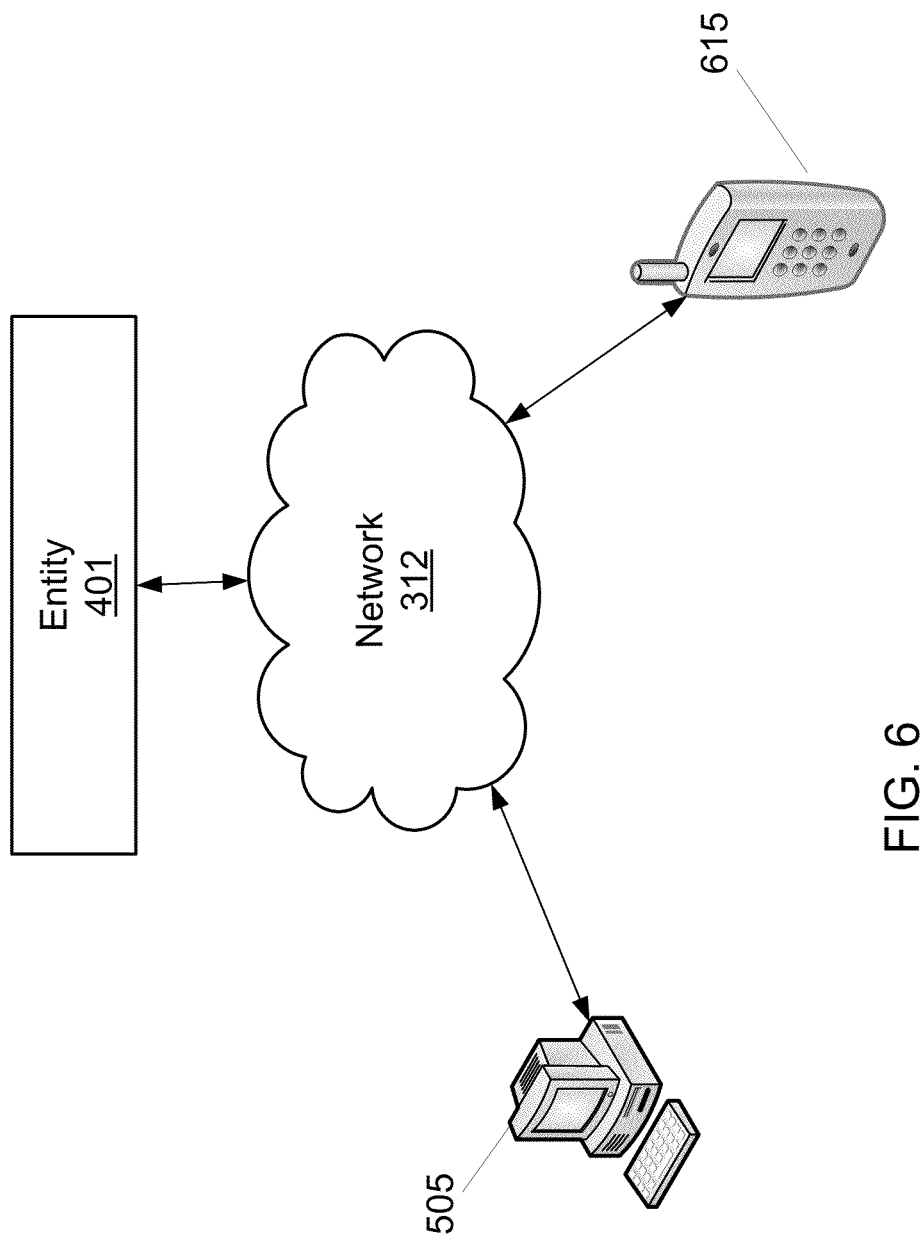
FIG. 6 is another illustrative block diagram of a system for deposit of monetary funds in accordance with at least one aspect of the present disclosure.

FIG. 6 is another illustrative block diagram of a system for deposit of monetary funds in accordance with at least one aspect of the present disclosure. FIG. 6 is similar to FIG. 5 except that it illustrates a system for generation and use of an electronic access code maintained in a mobile device 615 allowing deposit of monetary funds into an account where the individual making the deposit is a non-account owner on the account without the need for the mobile terminal to communicate with a self-service financial transaction device 300. An account owner, such as account owner 405 in FIG. 4, may access a self-service financial transaction device, such as self-service financial transaction device 300a in FIG. 4, or a computer 505 operatively connected to entity 401 through network 312. Computer 505 may be connected to entity 401 though network 312.

The account owner may access a corresponding account of the account owner that she has with the entity 401 by utilizing computer 505. After some form of authentication of the account owner, the account owner may request to generate an access code for permitting an individual to deposit monetary funds into the account associated with an entity. This individual being permitted to deposit monetary funds is not an account owner of the account. As part of the process for generating an access code to allow for automated deposit of monetary funds, the account owner may include one or more account owner defined criteria associated with the access code.

The access code may be generated by computer 505. In the example shown in FIG. 6, the account owner may request the computer 505 to output the access code by generating an email that includes the access code and/or an Internet accessible address to the access code. The access code may include any of a number of types of identification of the permission to deposit monetary funds into the account of the account owner without providing account number data of the account owner.

Account owner may distribute the access code to an individual that is not an owner of the associated account by dissemination of an email with the access code, a broadcast of the access code by means of a universal resource locator (URL) link, and/or some other manner. In the example of FIG. 6, the account owner may distribute an email with the access code included. An individual may access the email via a mobile device 615. Then, the individual may make a deposit of monetary funds into the account even though the individual is not an account owner on the account. The individual may utilize her mobile terminal 615 to make an electronic deposit of monetary funds into the account without accessing a self-service financial transaction device. In this example, the individual may receive the email with the access code via a cellular network connection to network 312 and then access a website of the entity 401 to authorize the deposit of monetary funds by utilizing her mobile terminal 615.

If one or more account owner criteria and/or restrictions have been associated with the access code, a determination may be made by the entity 401 and/or other external computer as to whether the individual is prevented from depositing monetary funds into the account associated with the access code. If no criteria exist and/or if no restrictions prevent the deposit, the individual utilizing the access code may deposit any of a number of different types of monetary funds electronically. Upon receipt of the monetary funds and optional confirmation of the monetary funds as not falsified monetary funds, the amount of the monetary funds may be transferred into the account of the account owner associated with the access code.

Still further, although described utilizing an access code received via an email on the entity 401 website in FIG. 6, in another example, an RFID associated with the mobile terminal 615 of the individual may be identified. The RFID may be correlated to a database of information as to the allowance of the individual to deposit electronic monetary funds into the account. In one example, upon receiving the RFID of the mobile terminal 615 of the individual, the website of the entity 401 may communicate with the mobile terminal 615 to receive additional data, such as an electronic access code.

Figure 7:
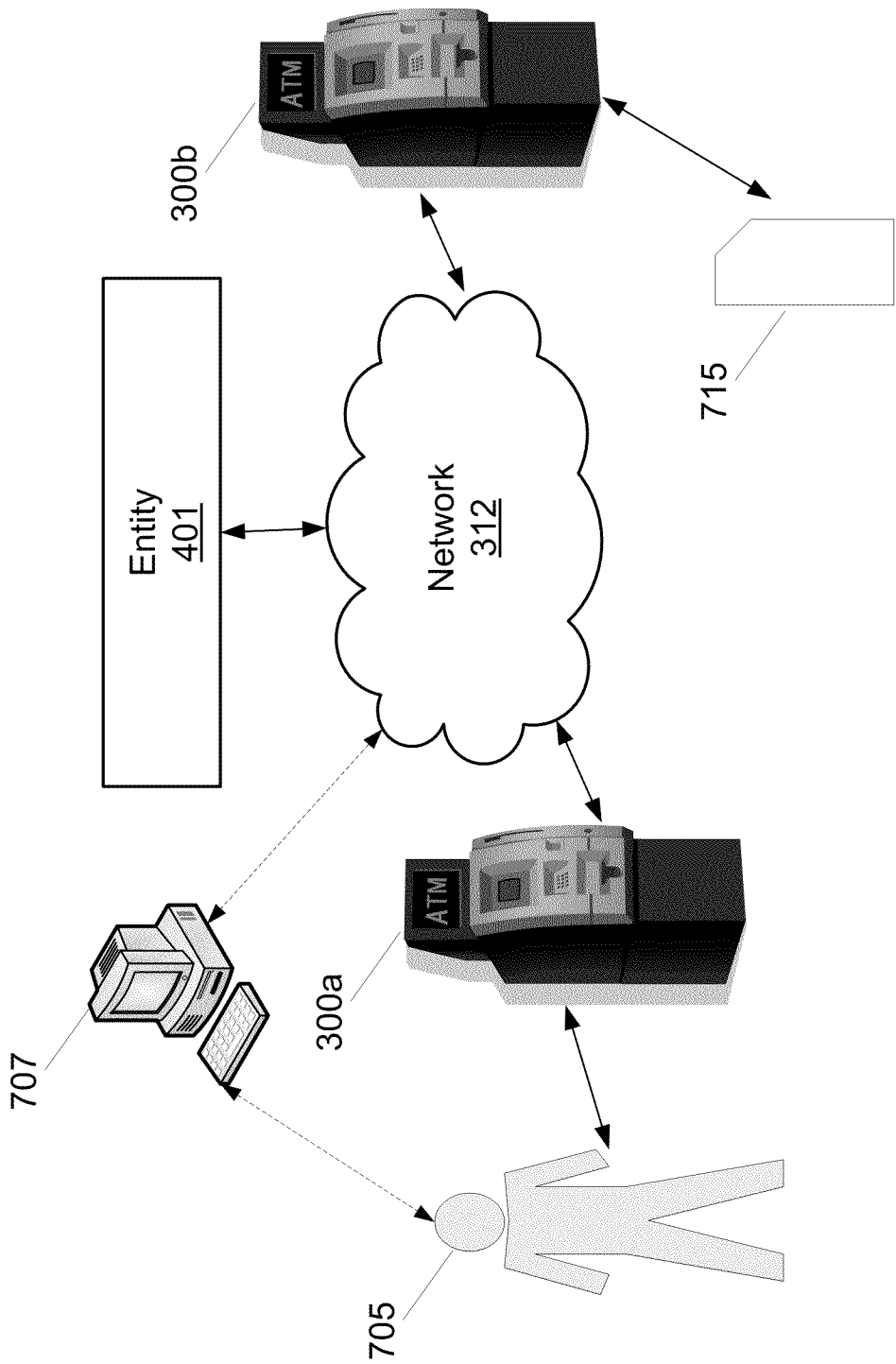
FIG. 7 is an additional illustrative block diagram of a system for deposit of monetary funds in accordance with at least one aspect of the present disclosure.

FIG. 7 is an additional illustrative block diagram of a system for deposit of monetary funds in accordance with at least one aspect of the present disclosure. FIG. 7 illustrates a system for generation and use of a magnetic card with an access code allowing deposit of monetary funds into an account where the individual making the deposit is a non-account owner on the account. An account owner 705 may access a self-service financial transaction device 300a, such as an automated teller machine (ATM). Alternatively, the account owner 705 may access a computer 707 operatively connected to an entity 401 through a network 312. The self-service financial transaction device 300a may be connected to entity 401 through network 312.

Account owner 705 may access a corresponding account of the account owner 705 that she has with the entity 401 by utilizing the self-service financial transaction device 300a. After some form of authentication of the account owner 705, the account owner 705 may request to generate an access code for permitting an individual to deposit monetary funds into the account associated with an entity. This individual being permitted to deposit monetary funds is not an account owner of the account. As part of the process for generating an access code to allow for automated deposit of monetary funds, the account owner 705 may include one or more account owner defined criteria associated with the access code.

The access code may be generated by the self-service financial transaction device 300a. In the example shown in FIG. 7, the account owner 705 may request the self-service financial transaction device 300a to output the access code by generating an email that includes the access code and/or an Internet accessible address to the access code. The access code may include any of a number of types of identification of the permission to deposit monetary funds into the account of the account owner 705 without providing account number data of the account owner 705.

Account owner 705 may distribute the access code to an individual that is not an owner of the associated account by dissemination of an email with the access code, a broadcast of the access code by means of a universal resource locator (URL) link, and/or some other manner. In the example of FIG. 7, the account owner 705 may distribute an email with the access code included. The individual may associate a credit card and/or debit card 715 with the access code included in the email. Alternatively, the access code automatically may be associated with the credit card and/or debit card 715.

Then, the individual may make a deposit of monetary funds into the account even though the individual is not an account owner on the account. The access code may be associated with a credit card and/or debit card 715 of the individual. The individual may utilize her associated credit card and/or debit card 715 at the same and/or a different self-service financial transaction device. As shown in FIG. 7, the individual may utilize her credit card and/or debit card 715 at a different self-service financial transaction device 300b although it is understood that the same self-service financial transaction device 300a may be used as well.

In the example of FIG. 7, entity 401 may own and/or operate the self-service financial transaction device 300b, like self-service financial transaction device 300a, for distribution of information and/or monetary funds to an individual and/or to receive information and/or monetary funds from an individual. As should be understood, self-service financial transaction devices 300a and 300b may be different self-service financial transaction devices that are owned and/or operated by different entities 401. In such an example, the two different entities 401 would perform common transfers of monetary funds in accordance with the description described herein in addition to conventional manners.

When accessing self-service financial transaction device 300b with a credit card and/or debit card 715, an individual may be identified as an individual that has an account, although different from the account associated with the credit card and/or debit card 715, with the entity 401. For example, entity 401 may be a bank and the account owner 705 may have a checking account associated with the access code and the individual using her credit card and/or debit card 715 at self-service financial transaction device 300b may have a different savings account with the entity bank 401.

If one or more account owner criteria and/or restrictions have been associated with the access code, a determination may be made by the self-service financial transaction device 300b and/or other external computer as to whether the individual is prevented from depositing monetary funds into the account associated with the access code. If no criteria exist and/or if no restrictions prevent the deposit, the individual utilizing the access code may deposit any of a number of different types of monetary funds into the self-service financial transaction device 300b. Upon receipt of the monetary funds and optional confirmation of the monetary funds as not falsified monetary funds, the amount of the monetary funds may be transferred into the account of the account owner 705 associated with the access code.

Figure 15:
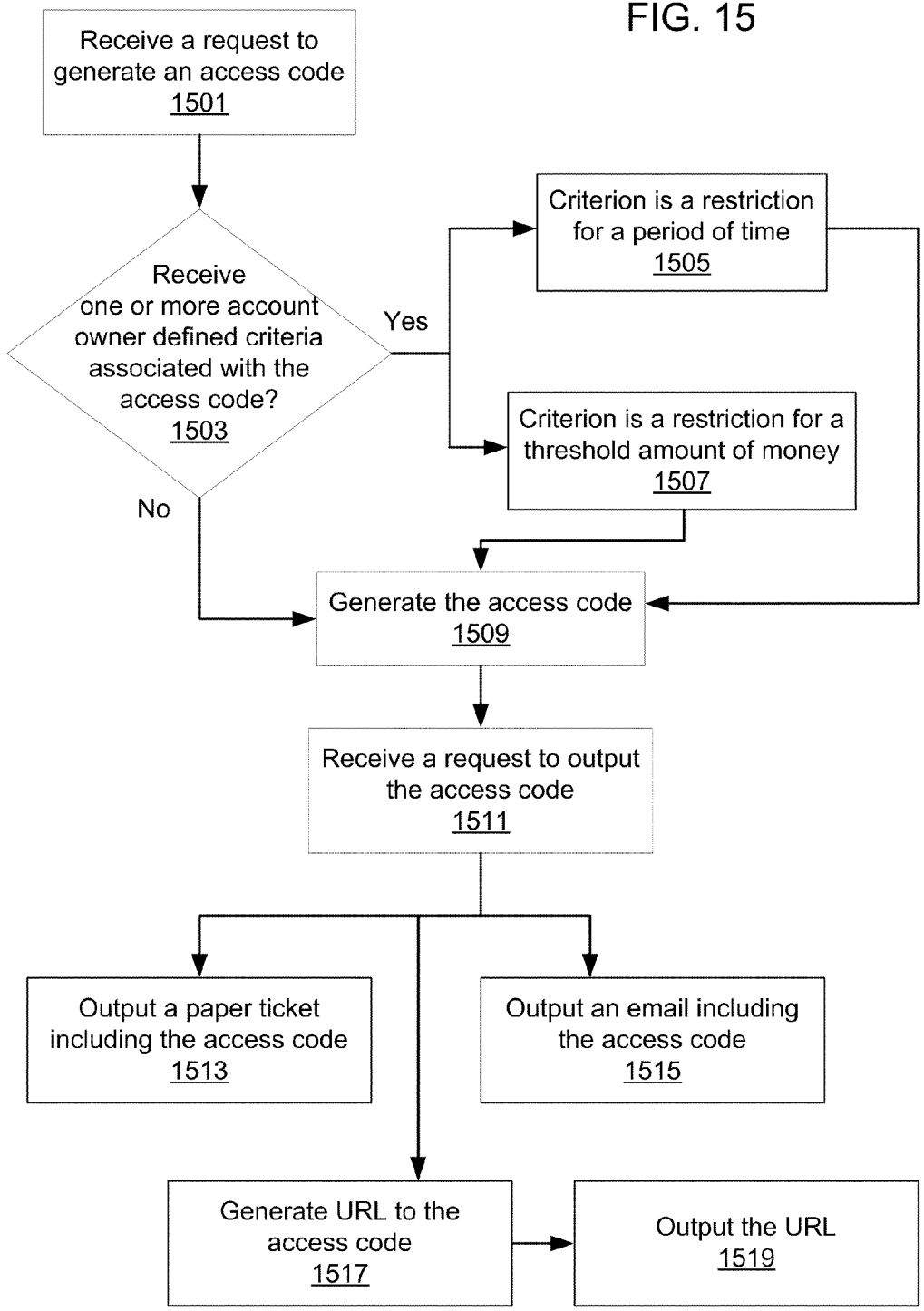
FIG. 15 is an illustrative flowchart of a method for generating an access code in accordance with at least one aspect of the present disclosure.

FIG. 15 is an illustrative flowchart of a method for generating an access code in accordance with at least one aspect of the present disclosure. The process starts and at 1501, a request may be received to generate an access code associated with an account with an entity. The entity may be a financial institution and the request may be an input received from an account owner utilizing a self-service financial transaction device, such as an automated teller machine. Upon receipt of the request, an illustrative user interface for generating the access code permitting deposit of monetary funds into the account may be displayed to the account owner. FIG. 10A illustrates a user interface 1000A that may be utilized. User interface 1000A may be displayed on a display of the self-service financial transaction device.

Returning to FIG. 15, at 1503, a determination may be made as to whether one or more account owner defined criteria associated with the access code have been received. User interface 1000A illustrates an area 1001 where the account owner may enter one or more of these account owner defined criteria to associate with the access code. These one or more criteria may include one or more restrictions on the permission to allow for deposit of monetary funds into the account. Such an illustrative criterion includes a restriction on the time period in which a deposit may be made. The account owner may want to allow an individual to only deposit for a specific period of time, for an allowable period of time in a day, month, year, and/or until a specific date and time. Another illustrative criterion includes a restriction on requiring a minimum and/or maximum threshold amount of monetary funds that may be deposited. The account owner may desire that minimum amounts of monetary funds are required for depositing and/or a maximum amount may be set as a threshold to restrict large amounts of deposit in the account. Other restrictions include only allowing paper tickets to be utilized for deposit of monetary funds. Any of a number of other restrictions and/or account owner defined criteria may be associated with the access code.

If no account owner defined criteria are received, the process may move to 1509 directly. If one or more account owner defined criteria associated with the access code have been received, in 1505 and 1507, the respective criterion may be noted for the access code as a parameter to be addressed when determining whether an individual utilizing the access code is permitted to deposit monetary funds into the account of the account owner. Following the receipt of the account owner defined criteria, the process moves to 1509.

In 1509, the access code may be generated. Generation of the access code may occur in response to an input received from an account owner requesting the same, such as operational button 1003 illustratively shown in user interface 1000A. Moving to 1511, a request to output the access code may be received. The request may be from the account owner in order to disseminate the access code to one or more other individuals who are not owners on the associated account. FIG. 10B illustrates a user interface 1000B that may be utilized in accordance with the description herein. User interface 1000B may be displayed on a display of the self-service financial transaction device. User interface 1000B illustrates a message 1005 to the account owner allowing the account owner to enter a manner for distribution of the access code.

As shown in FIG. 10B, user interface 1000B includes message 1005 requesting the account owner decide to output a paper ticket with the access code, obtain an Internet accessible address to the access code, and/or output an email that includes the access code. Upon selection of one or more of these outputs, the system may be configured to operate in response. For example, the self-service financial device may print a paper ticket in 1513 in response to the first option in 1005. In response to the second option, a URL link may be generated in 1517 and the URL may then be provided 1519 in some manner to the account owner, whether shown on the display of the self-service financial transaction device, associated with the account of the account owner of access at another computer, and/or electronic transfer to a device of the account owner. In response to the third option shown with respect to message 1005, the self-service financial transaction device may be configured to send an email that includes the access code in 1515. The email may be sent to the account owner for forwarding to others and/or may be sent directly to the other individuals for use in depositing monetary funds into the account associated with the access code.

Figure 16:
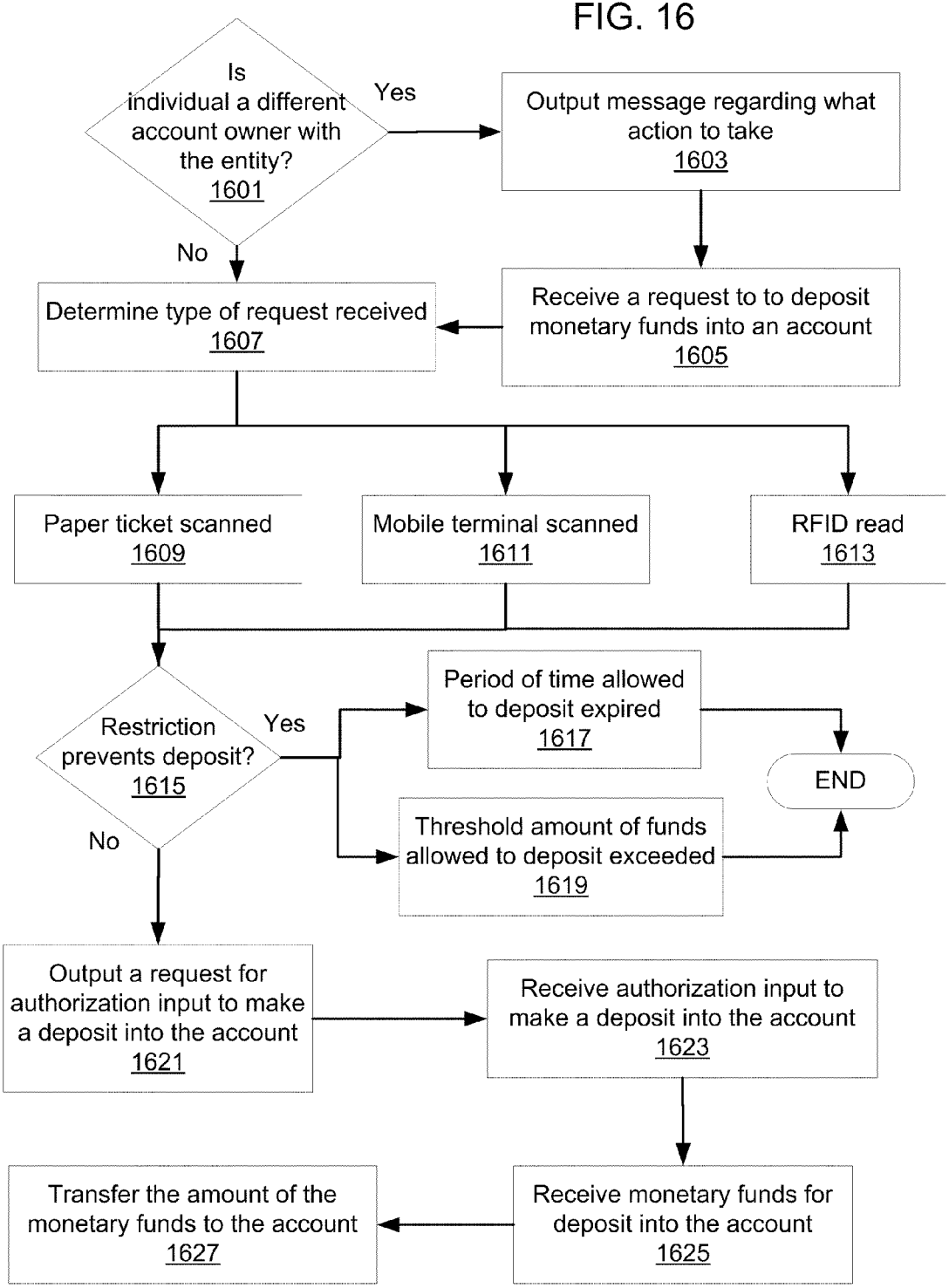
FIG. 16 is an illustrative flowchart of a method for depositing monetary funds into an account in accordance with at least one aspect of the present disclosure.

FIG. 16 is an illustrative flowchart of a method for depositing monetary funds into an account in accordance with at least one aspect of the present disclosure. An individual may access a self-service financial transaction device in order to attempt to deposit monetary funds into an account in which she is not an owner. The process starts and at 1601, a determination may be made as to whether the individual is an account owner on a different account with the entity that the account she is attempting to deposit into is associated with. For example, the individual seeking to make a deposit of monetary funds may be a customer of the entity and have a different savings account associated with the entity. The account in which the individual seeks to make a deposit of the monetary funds may be a checking account associated with the entity. As such, in this example, the result of 1601 is yes and the process moves to 1603. If the individual seeking to make a deposit is not an account owner of another account with the entity, the process moves to 1607 directly.

In 1603, a message may be outputted to the individual to inquire as to what action the individual would like to take. Such a message may be a textual and/or graphical message displayed on a device, such as a self-service financial transaction device. Such a message also may be an audio message and/or a combination of audio and video. FIG. 9A is an illustrative user interface 900A that may be displayed as a message as described herein. In user interface 900A, message 901 may be displayed to the individual to inquire as to whether the individual would like to access her account with the entity or the account in which she is not an account owner. In the example of FIG. 9A, it is Account ID X. Proceeding to 1605, the individual chooses to deposit monetary funds into Account ID X in FIG. 9A.

Moving to 1607, the system may determine the type of request received from the individual. If a paper ticket is being used by the individual, the process moves to 1609 where the paper ticket may be scanned by a self-service financial transaction device. If a mobile terminal is being used to display an access code on a display of the mobile terminal, the process moves to 1611 where the mobile terminal may be scanned by a self-service financial transaction device. A barcode on the display of the mobile terminal may be scanned by the self-service financial transaction device. If a mobile terminal is being used with an associated RFID, the RFID of the mobile terminal may be read in 1613 by a self-service financial transaction device. Whether by way of 1609, 1611, or 1613, the process moves to 1615.

In 1615, a determination may be made as to whether a restriction exists on depositing into the account by the individual. Any of multiple types of restrictions may prevent the deposit of monetary funds by the individual. For example, if a period of time has expired for the individual to make a deposit in 1617, the individual is prevented from making a deposit and the process ends. If a threshold amount of monetary funds the individual desires to deposit is exceeded, the individual is prevented from making a deposit and the process ends. An account owner may desire to have a maximum threshold allowed for a deposit into her account to reduce the impact of taxes on monetary funds gained. Any of a number of different types of restrictions may exist and any of a number of restrictions may be implemented by an account owner. If there are no restrictions preventing the deposit of monetary funds by the individual in 1615, the process moves to 1621.

Figure 9B:
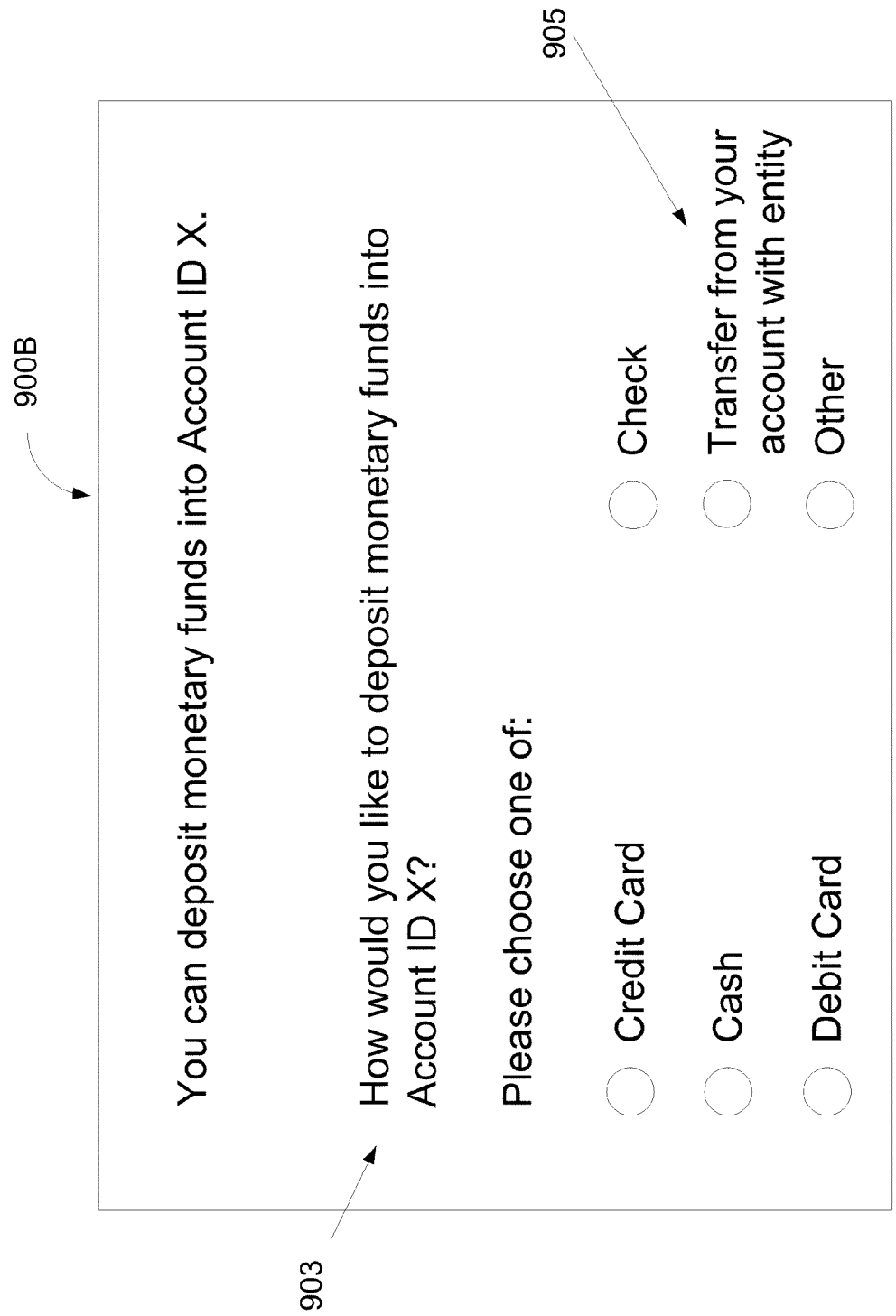

In 1621, the system may output a request for authorization input from the individual to make a deposit into the account. FIG. 9B is an illustrative user interface 900B for depositing monetary funds into the account when the individual seeking to deposit monetary funds has a separate account with the entity. As shown, user interface 900B may include a message 903 to the individual to inquire as to the manner that the individual would like to use for depositing the monetary funds into the account. For example, the individual may deposit one or more of cash, checks, or a credit card. In addition, because in the example of FIG. 9B the individual is an owner of a different account with the entity, the individual is presented with an option 905 to transfer funds from the individual's different account with the entity directly to the account the individual desires to deposit monetary funds to.

FIG. 8 is an illustrative user interface 800 for depositing monetary funds into the account when the individual seeking to deposit monetary funds does not have a separate account with the entity. As shown, user interface 800 may include a message 801 to the individual to inquire as to the manner that the individual would like to use for depositing the monetary funds into the account. For example, the individual may deposit one or more of cash, checks, or a credit card. Any of a number of different manners for depositing monetary funds may be included and the examples included herein are merely illustrative.

Following 1621, the process moves to 1623 where an authorization input to make a deposit into the account may be received. An example authorization input may be choosing of one of the options shown in illustrative user interface 900B or 800. In 1625, the monetary funds for deposit into the account are received. Receipt may be in the form of cash being received, a check being received, or a credit card being charged. Then, in 1627 the amount of the monetary funds deposited may be transferred to the account.

Figure 17:
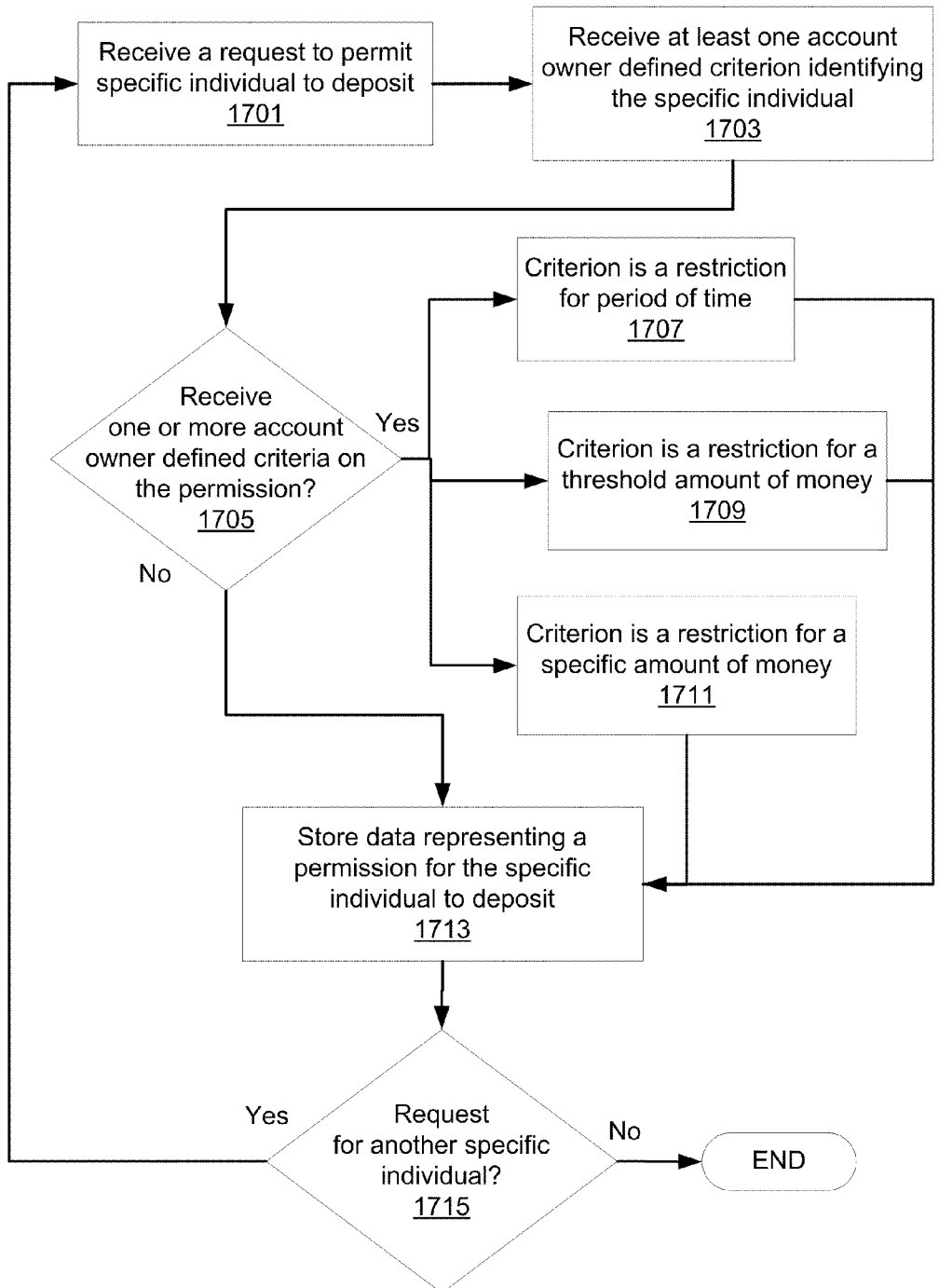
FIG. 17 is an illustrative flowchart of a method for permitting a specific individual to deposit monetary funds in an account in accordance with at least one aspect of the present disclosure.

FIG. 17 is an illustrative flowchart of a method for permitting a specific individual to deposit monetary funds in an account in accordance with at least one aspect of the present disclosure. In 1701, a request may be received to permit a specific individual to deposit monetary funds into an account in which the individual is not an account owner. FIG. 11A illustrates a user interface 1100A that may be displayed to an account owner in response to 1701. An account owner may want to grant a specific individual the right to deposit. For example, the account owner may be a parent and the parent may want to grant a grandparent the right to deposit funds into the account.

In 1703, one or more account owner defined criteria identifying the specific individual may be identified. Any of a number of different account owner defined criteria may be entered by the account owner. In user interface 1100A in FIG. 11A, a number of different account owner defined criterion 1101 may be entered by an account user and received by the system in 1703. Examples include a name, a date of birth, and an ID number, such as a social security number or driver's license number. The process then moves to 1705 where a determination may be made as to whether one or more account owner defined criteria on the permission to grant deposit access is received. If not, the process proceeds to 1713.

If one or more account owner defined criteria are received, the received criteria are identified. User interface 1100B shown in FIG. 11B illustrates an example user interface for an account owner to input one or more account owner defined criteria 1105. The one or more account owner defined criteria may include one or more restrictions on the permission to deposit monetary funds for the specific individual. The account owner may enter a restriction on the period of time in which the specific individual may deposit monetary funds into the account, such as until a specific date and time. Such a date and time may be just before midnight on the last day of a taxable calendar year. As such, no monetary funds may be received in a new calendar year that may affect taxes of the account owner adversely. Such a period of time restriction may be identified in 1707. The account owner may enter a restriction for a threshold amount of monetary funds, whether a maximum amount and/or a minimum amount, the specific individual is required to deposit into the account, such as at least $5. Such a threshold amount of monetary funds restriction may be identified in 1709. The account owner may enter a restriction for a specific amount of monetary funds the specific individual is required to deposit into the account, such as $100. An account owner may desire to specify the amount to ensure that the individual neither deposits too much monetary funds nor deposits too little. Such a specific amount of monetary funds restriction may be identified in 1711.

Proceeding to 1713, data representing a permission for the specific individual to deposit monetary funds into the account, including any account owner defined criteria associated therewith, may be stored in one or more memories for use by the system when the specific individual may attempt to make a deposit into the account. The process of 1715 may be implemented in response to an entry of the account owner. As shown in FIG. 11B, an account owner may access button 1107 to initiate the storage of the permission for the specific individual. Then, in 1717, a determination may be made as to whether a request for another specific individual is received. If not, the process ends. If a request is received to generate a permission for deposit of monetary funds into the account by another specific individual, the process may return to 1701. Each specific individual may have one or more similar and/or different restrictions on a corresponding restriction compared to another specific individual.

Figure 18:
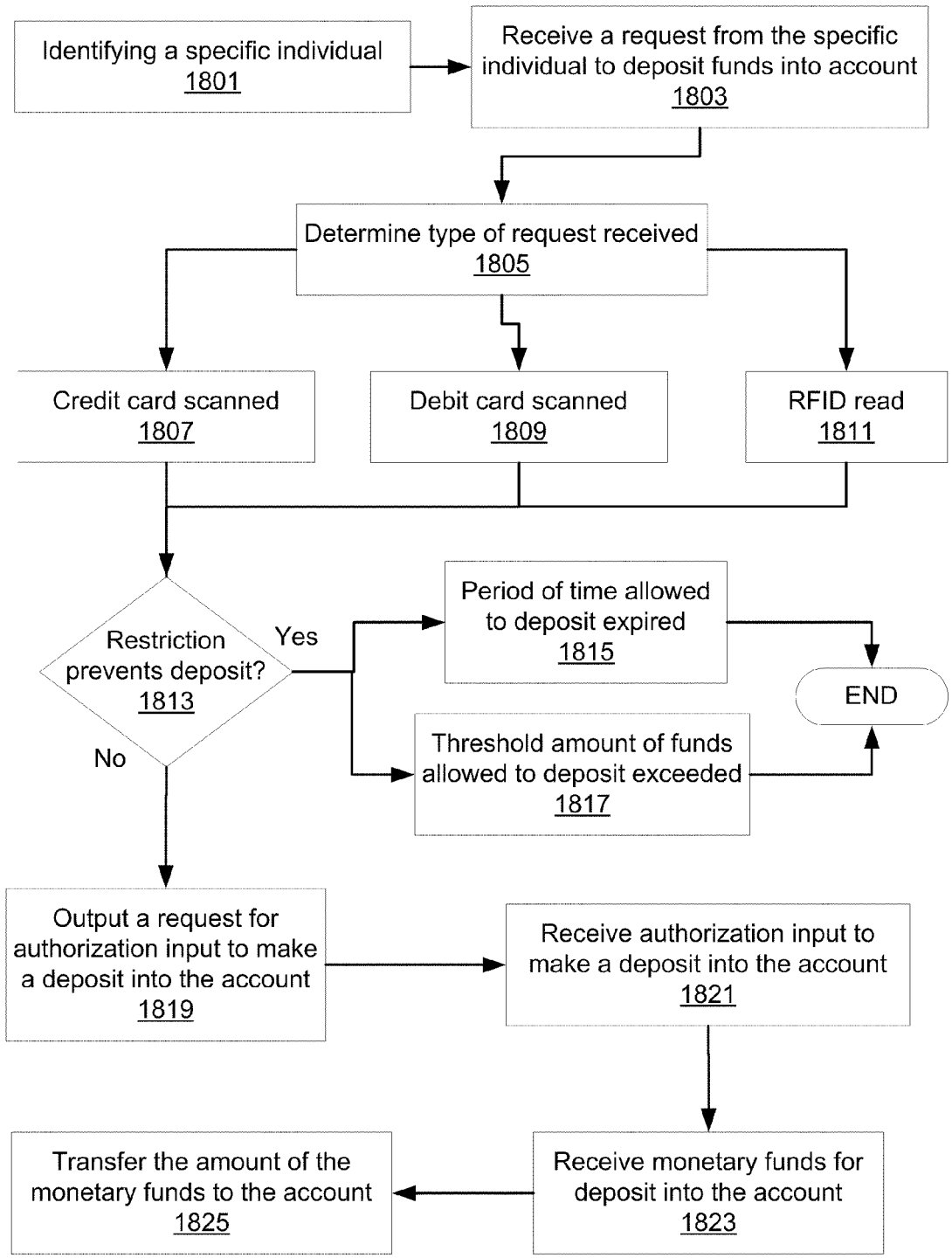
FIG. 18 is an illustrative flowchart of a method for depositing monetary funds into an account in accordance with at least one aspect of the present disclosure.

FIG. 18 is an illustrative flowchart of a method for depositing monetary funds into an account in accordance with at least one aspect of the present disclosure. The description of FIG. 18 may follow the description of FIG. 17. The process starts and at 1801 a specific individual may be identified. Identification of the specific individual may be in response to the specific individual accessing a card reader of a self-service financial transaction device. Having identified the specific individual, in 1803 a request from the specific individual to deposit monetary funds into an account in which the specific individual is not an owner may be received.

In 1805, the type of request received in 1803 may be determined. If the request is received by a credit card, the credit card may be scanned and accessed in 1807. If the request is received by a debit card, the debit card may be scanned and accessed in 1809. If the request is received by a mobile terminal, an RFID associated with the mobile terminal may be read in 1811.

In 1813, a determination may be made as to whether a restriction exists on depositing into the account by the specific individual. Any of multiple types of restrictions may prevent the deposit of monetary funds by the specific individual. For example, if a period of time has expired for the specific individual to make a deposit in 1815, the specific individual is prevented from making a deposit and the process ends. If a threshold amount of monetary funds the specific individual desires to deposit is exceeded in 1817, the specific individual is prevented from making a deposit and the process ends. Any of a number of different types of restrictions may exist and any of a number of restrictions may be implemented by an account owner. If there are no restrictions preventing the deposit of monetary funds by the specific individual in 1813, the process moves to 1819.

In 1819, the system may output a request for authorization input from the specific individual to make a deposit into the account. Following 1819, the process moves to 1821 where an authorization input to make a deposit into the account may be received. In 1823, the monetary funds for deposit into the account are received. Receipt may be in the form of cash being received, a check being received, or a credit card being charged. Then, in 1825 the amount of the monetary funds deposited may be transferred to the account.

Figure 12:
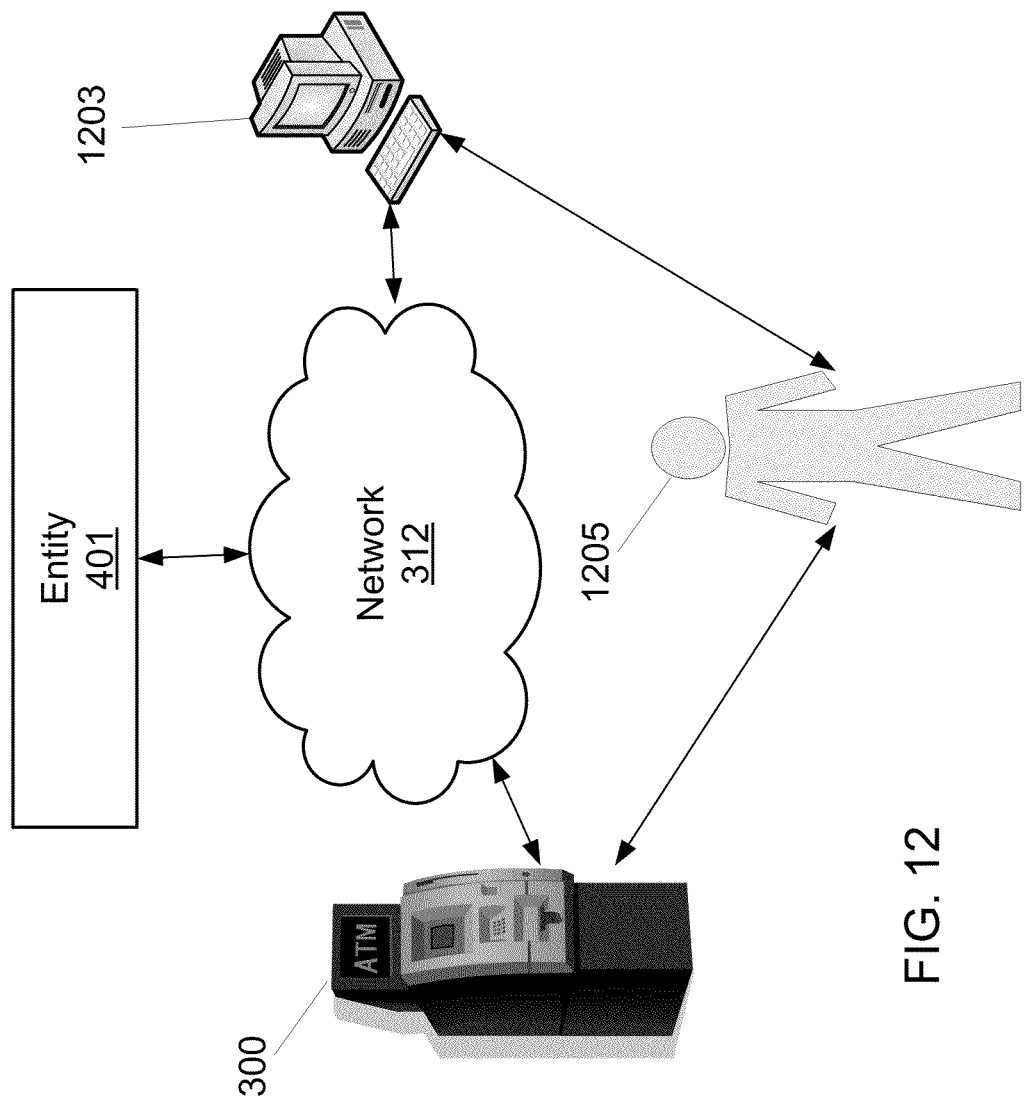
FIG. 12 is an additional illustrative block diagram of a system for deposit of monetary funds in accordance with at least one aspect of the present disclosure.

FIG. 12 is an additional illustrative block diagram of a system for deposit of monetary funds in accordance with at least one aspect of the present disclosure. FIG. 12 illustrates a system for generation and use of a credit card and/or debit card allowing deposit of a credit card payment in a self-service financial transaction device where the individual making the deposit does not have a self-service financial transaction device checking and/or savings account. An individual 1205 may have a credit card account associated with an entity 401. Individual 1205 may not have a corresponding checking and/or savings account with the entity 401 that normally entitles an individual to receive and use an access card, e.g., an ATM card, on a self-service financial transaction device.

The individual 1205 may access a computer 1203 operatively connected to the entity 401 through a network 312. Individual 1205 may access a corresponding credit card account that she has with the entity 401 by utilizing computer 1203. After some form of authentication of the individual 1205, the individual may request permission for the individual 1205 to deposit a credit card payment in a self-service financial transaction device associated with an entity.

As part of the process for generating a permission to allow for automated deposit of a credit card payment, the individual 1205 may include one or more credit card owner defined criteria associated with the permission. In addition, these one or more criteria may include one or more restrictions on the permission to allow for deposit of a credit card payment at a self-service financial transaction device associated with the entity 401. Individual 1205 may access a self-service financial transaction device 300. Then, the individual 1205 may make a deposit of a credit card payment in the self-service financial transaction device 300.

Figure 19:
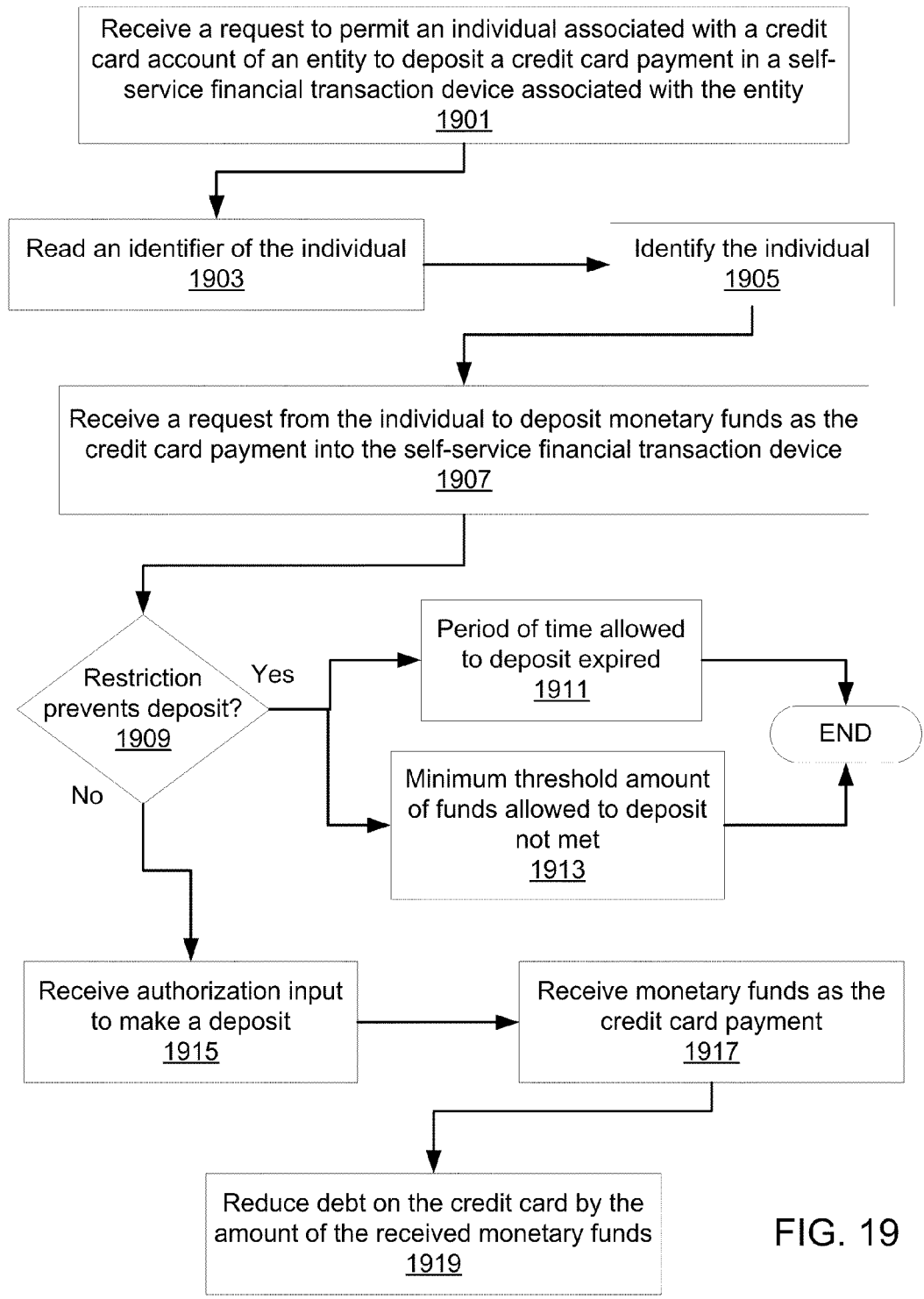
FIG. 19 is an illustrative flowchart of a method for permitting a credit card payment in accordance with at least one aspect of the present disclosure.

FIG. 19 is an illustrative flowchart of a method for permitting a credit card payment in accordance with at least one aspect of the present disclosure. In 1901, a request to permit an individual associated with a credit card account on an entity to deposit a credit card payment in a self-service financial transaction device associated with the entity may be received. FIG. 13 illustrates a user interface 1300 for permitting deposit of a credit card payment in a self-service financial service device in accordance with at least one aspect of the present disclosure. Any of a plurality of restrictions may be imposed by the credit card account owner as shown by 1301. Depression of button 1303 may store a permission of the credit card account owner with any associated restriction, as data on one or more memories.

Proceeding to 1903, an identifier of the individual may be read at a self-service financial transaction device associated with the entity. In 1905, the individual may be identified by the system as the credit card account owner. In 1907, a request from the individual to deposit monetary funds as the credit card payment into the self-service financial transaction device may be received. FIG. 14 illustrates a user interface 1400 for depositing a credit card payment into a self-service financial transaction device in accordance with at least one aspect of the present disclosure. The request received in 1907 may correlate to the individual selecting one of the options identified by 1401.

In 1909, a determination may be made as to whether a restriction exists on depositing the credit card payment by the individual. Any of multiple types of restrictions may prevent the deposit of the credit card payment by the individual. For example, if a period of time has expired for the individual to make a deposit in 1911, the individual is prevented from making a deposit and the process ends. If a minimum threshold amount of monetary funds the individual is allowed to deposit is not met in 1913, the individual is prevented from making a deposit and the process ends. Any of a number of different types of restrictions may exist and any of a number of restrictions may be implemented. If there are no restrictions preventing the deposit of a credit card payment by the individual in 1909, the process moves to 1915.

In 1915, an authorization input to make a deposit of a credit card payment may be received. In 1917, the monetary funds as the credit card payment are received. Receipt may be in the form of cash being received, a check being received, or a credit card being charged. Then, in 1917 the amount of the monetary funds deposited may be used to reduce debt on the credit card of the individual.

One or more configurations and/or embodiments of the present disclosure in accordance with one or more aspects described herein may occur in other depositor and service provider environments, such as a depositor and teller of a financial entity. In one example, a depositor may have a paper ticket to allow for deposit of monetary funds into another individual's account. The depositor may provide the paper ticket to the teller. Without a need for identification from the depositor, the teller may receive the monetary funds for deposit and deposit those monetary funds into the account of the other individual pursuant to any restrictions associated with the paper ticket as described herein. In still other configurations, as an alternative to creation at a separate computer and/or ATM, an account owner may create a paper ticket at a counter of a teller at a financial entity. The account owner may then distribute the paper ticket to the depositor for depositing of monetary funds into the individual's account.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. A method comprising:
   receiving, at a computer of an entity, a first request by an account owner to permit a first specific individual to deposit monetary funds into the owner's account maintained with the entity, the first specific individual not being an account owner of the account and the account owner being a customer of the entity;
   receiving, at the computer, at least one account owner defined criterion identifying the first specific individual; and
   storing data representing a permission for the first specific individual to deposit monetary funds into the owner's account maintained with the entity.

2. The method of claim 1, wherein the at least one account owner defined criterion identifying the first specific individual includes a transaction number maintained with the first individual.

3. The method of claim 1, further comprising receiving, at the computer, at least one account owner defined restriction on the permission for the first specific individual to deposit monetary funds into the owner's account maintained with the entity.

4. The method of claim 3, wherein the at least one account owner defined restriction includes a period of time the first specific individual is permitted to deposit monetary funds in the owner's account.

5. The method of claim 3, wherein the at least one account owner defined restriction includes a threshold amount of monetary funds permitted to be deposited in the owner's account by the first specific individual.

6. The method of claim 5, wherein the threshold is a maximum amount of monetary funds permitted to be deposited in the owner's account by the first specific individual.

7. The method of claim 3, wherein the at least one account owner defined restriction includes a specific amount of monetary funds permitted to be deposited in the owner's account by the first specific individual.

8. The method of claim 1, further comprising:
   receiving, at the computer, a second request to permit a second specific individual, different from the first specific individual, to deposit monetary funds into the owner's account maintained with the entity, the second specific individual not being an account owner of the account;
   receiving, at the computer, at least one account owner defined criterion identifying the second specific individual; and
   storing data representing a permission for the second specific individual to deposit monetary funds into the owner's account maintained with the entity.

9. The method of claim 8, further comprising:
   receiving, at the computer, at least one account owner defined first restriction on the permission for the first specific individual to deposit monetary funds into the owner's account maintained with the entity; and
   receiving, at the computer, at least one account owner defined second restriction on the permission for the second specific individual to deposit monetary funds into the owner's account maintained with the entity.

10. The method of claim 9, wherein the at least one account owner defined first restriction and the at least one account owner defined second restriction are different types of restrictions.

11. The method of claim 9, wherein the first specific individual is an owner of a different account maintained with the entity and the second specific individual has no account maintained with the entity.

12. A method comprising:
    determining, by a computer of an entity, whether a first specific individual is permitted to deposit monetary funds into an owner's account maintained with the entity, the first specific individual not being the account owner of the account and the account owner being a customer of the entity;
    receiving, at the computer, a first request from the first specific individual to deposit monetary funds into the owner's account maintained with the entity; and
    receiving, at the computer, monetary funds from the first specific individual for deposit in the owner's account.

13. The method of claim 12, the determining including identifying the first specific individual.

14. The method of claim 13, the identifying the first specific individual including reading a form of identification of the first specific individual, the form of identification including at least one of: a credit card of the first specific individual, a debit card of the first specific individual, and an RFID maintained with a mobile terminal of the first specific individual.

15. The method of claim 12, the determining including determining if at least one restriction prevents authorization to deposit monetary funds into the owner's account by the first specific individual.

16. The method of claim 15, wherein the at least restriction includes a specific amount of monetary funds permitted to be deposited in the owner's account by the first specific individual.

17. The method of claim 12, wherein the first specific individual is an owner of a different account maintained with the entity, the receiving, at the computer, monetary funds includes receiving an authorization input from the first specific individual to transfer an amount of monetary funds to the owner's account from the different account.

18. An apparatus of a financial entity comprising:
   at least one processor; and
   at least one memory having stored therein computer executable instructions, that when executed by the at least one processor, cause the apparatus to:
      receive a first request to permit a first specific individual to deposit monetary funds into an owner's account maintained with the financial entity, the first specific individual not being the account owner of the account and the account owner being a customer of the financial entity;
      receive at least one account owner defined criterion identifying the first specific individual; and
      store data representing a permission for the first specific individual to deposit monetary funds into the owner's account maintained with the financial entity.

19. The apparatus of claim 18, the computer executable instructions, that when executed by the at least one processor, further cause the apparatus to receive at least one account owner defined restriction on the permission for the first specific individual to deposit monetary funds into the owner's account maintained with the financial entity.

20. The apparatus of claim 18, the computer executable instructions, that when executed by the at least one processor, further cause the apparatus to:
   receive a second request to permit a second specific individual, different from the first specific individual, to deposit monetary funds into the owner's account maintained with the financial entity, the second specific individual not being an account owner of the account;
   receive at least one account owner defined criterion identifying the second specific individual; and
   store data representing a permission for the second specific individual to deposit monetary funds into the owner's account maintained with the financial entity.

21. The apparatus of claim 20, the computer executable instructions, that when executed by the at least one processor, further cause the apparatus to perform:
   receive at least one account owner defined first restriction on the permission for the first specific individual to deposit monetary funds into the owner's account maintained with the financial entity; and
   receive at least one account owner defined second restriction on the permission for the second specific individual to deposit monetary funds into the owner's account maintained with the financial entity.

22. The apparatus of claim 21, wherein the at least one account owner defined first restriction and the at least one account owner defined second restriction are different types of restrictions.

23. An apparatus of a financial entity comprising:
   at least one scanner configured to capture, from a first specific individual, data representative of an identity of the first specific individual, the first specific individual not being an account owner of the account;
   at least one deposit unit configured to receive monetary funds from the first specific individual for deposit in the owner's account;
   at least one processor; and
   at least one memory having stored therein computer executable instructions, that when executed by the at least one processor, cause the apparatus to:
      determine whether a first specific individual is permitted to deposit monetary funds into an owner's account maintained with the financial entity, the first specific individual not being an account owner of the account and the account owner being a customer of the financial entity;
      receive a first request from the first specific individual to deposit monetary funds into the owner's account maintained with the financial entity; and
      receive monetary funds from the first specific individual for deposit in the owner's account.

24. The apparatus of claim 23, determine including reading, by the at least one scanner, a form of identification of the first specific individual, the form of identification includes at least one of: a credit card of the first specific individual, a debit card of the first specific individual, and an RFID maintained with a mobile terminal of the first specific individual.

25. The apparatus of claim 23, determine if at least one restriction prevents authorization to deposit monetary funds into the owner's account by the first specific individual.

26. The apparatus of claim 23, wherein the first specific individual is an owner of a different account maintained with the financial entity, the receipt monetary funds includes receipt of an authorization input from the first specific individual to transfer an amount of monetary funds to the owner's account from the different account.

27. One or more non-transitory computer-readable media storing computer-readable instructions that, when executed by at least one computer of a financial entity, cause the at least one computer to perform a method of:
   receiving a first request to permit a first specific individual to deposit monetary funds into an owner's account maintained with the financial entity, the first specific individual not being an account owner of the account and the account owner being a customer of the entity;
   receiving at least one account owner defined criterion identifying the first specific individual; and
   storing data representing a permission for the first specific individual to deposit monetary funds into the owner's account maintained with the financial entity.

28. The one or more non-transitory computer-readable media of claim 27, the computer-readable instructions that, when executed by at least one computer, further cause the at least one computer to perform receiving at least one account owner defined restriction on the permission for the first specific individual to deposit monetary funds into the owner's account maintained with the financial entity.

29. The one or more non-transitory computer-readable media of claim 27, the computer-readable instructions that, when executed by at least one computer, further cause the at least one computer to perform:
   receiving a second request to permit a second specific individual, different from the first specific individual, to deposit monetary funds into an owner's account maintained with the financial entity, the second specific individual not being the account owner of the account;
   receiving at least one account owner defined criterion identifying the second specific individual; and storing data representing a permission for the second specific individual to deposit monetary funds into the owner's account maintained with the financial entity.

30. One or more non-transitory computer-readable media storing computer-readable instructions that, when executed by at least one computer of a financial entity, cause the at least one computer to perform a method of:
- determining whether a first specific individual is permitted to deposit monetary funds into an owner's account maintained with an entity, the first specific individual not being an account owner of the account and the account owner being a customer of the financial entity;
- receiving, at the computer, a first request from the first specific individual to deposit monetary funds into the owner's account maintained with the entity; and
- receiving, at the computer, monetary funds from the first specific individual for deposit in the owner's account.

31. The one or more non-transitory computer-readable media of claim 30, the computer-readable instructions that, when executed by at least one computer, further cause the at least one computer to perform determining including identifying the first specific individual.

32. The one or more non-transitory computer-readable media of claim 31, the identifying the first specific individual including reading a form of identification of the first specific individual, the form of identification including at least one of: a credit card of the first specific individual, a debit card of the first specific individual, and an RFID maintained with a mobile terminal of the first specific individual.

33. The one or more non-transitory computer-readable media of claim 30, wherein the first specific individual is an owner of a different account maintained with the financial entity, the receiving, at the computer, monetary funds includes receiving an authorization input from the first specific individual to transfer an amount of monetary funds to the owner's account from the different account.

* * * * *